(12) United States Patent
Ramanujan et al.

(10) Patent No.: US 10,659,476 B2
(45) Date of Patent: May 19, 2020

(54) TRANSPARENT BRIDGE FOR MONITORING CRYPTO-PARTITIONED WIDE-AREA NETWORK

(71) Applicant: Architecture Technology Corporation, Minneapolis, MN (US)

(72) Inventors: Ranga Ramanujan, Medina, MN (US); Benjamin L. Burnett, Prior Lake, MN (US)

(73) Assignee: ARCHITECTURE TECHNOLOGY CORPORATION, Minneapolis, MN (US)

(*) Notice: Subject to any disclaimer, the term of this patent is extended or adjusted under 35 U.S.C. 154(b) by 200 days.

(21) Appl. No.: 15/262,979

(22) Filed: Sep. 12, 2016

(65) Prior Publication Data

US 2018/0077171 A1    Mar. 15, 2018

(51) Int. Cl.
*H04L 29/06* (2006.01)
*H04L 12/28* (2006.01)

(52) U.S. Cl.
CPC ...... *H04L 63/1408* (2013.01); *H04L 12/2854* (2013.01); *H04L 63/1441* (2013.01); *H04L 63/1458* (2013.01); *H04L 63/1483* (2013.01); *H04L 69/22* (2013.01); *H04L 2463/121* (2013.01)

(58) Field of Classification Search
CPC .......... H04L 2463/121; H04L 12/2854; H04L 63/1441; H04L 69/22
See application file for complete search history.

(56) References Cited

U.S. PATENT DOCUMENTS

| | | | |
|---|---|---|---|
| 6,625,118 B1* | 9/2003 | Hadi Salim | H04L 12/5602 370/229 |
| 7,111,072 B1* | 9/2006 | Matthews | H04L 12/42 370/412 |
| 7,995,475 B2 | 8/2011 | Ramanujan et al. | |
| 9,407,565 B1* | 8/2016 | Li | H04L 47/266 |
| 2002/0097724 A1* | 7/2002 | Halme | H04L 67/1002 370/392 |
| 2006/0182039 A1* | 8/2006 | Jourdain | H04L 47/10 370/252 |
| 2006/0221974 A1* | 10/2006 | Hilla | H04L 45/60 370/394 |

(Continued)

FOREIGN PATENT DOCUMENTS

WO    WO2014077905    * 5/2014

*Primary Examiner* — Mahfuzur Rahman
*Assistant Examiner* — Darshan I Dhruv
(74) *Attorney, Agent, or Firm* — Shumaker & Sieffert, P.A.

(57) ABSTRACT

This disclosure is directed to monitoring a crypto-partitioned, or cipher-text, wide-area network (WAN). A first computing device may be situated in a plain-text portion of a first enclave behind a first inline network encryptor (INE). A second device may be positioned in a plain-text portion of a second enclave behind a second INE. The two enclaves may be separated by a cipher-text WAN, over which the two enclaved may communicate. The first computing device may receive a data packet from the second computing device. The first computing device may then determine contents of a header of the data packet. The first computing device may, based at least in part on the contents of the header of the data packet, determine a status of the cipher-text WAN.

28 Claims, 23 Drawing Sheets

(56) References Cited

U.S. PATENT DOCUMENTS

| | | | |
|---|---|---|---|
| 2007/0121615 A1* | 5/2007 | Weill | H04L 12/4633 370/389 |
| 2007/0265875 A1* | 11/2007 | Jiang | H04L 63/068 455/550.1 |
| 2008/0162929 A1* | 7/2008 | Ishikawa | H04L 9/0833 713/160 |
| 2008/0262990 A1* | 10/2008 | Kapoor | G06F 9/505 706/20 |
| 2008/0276001 A1* | 11/2008 | Menon | H04L 1/205 709/233 |
| 2008/0279181 A1* | 11/2008 | Shake | H04L 1/08 370/389 |
| 2010/0091650 A1* | 4/2010 | Brewer, Jr. | H04L 47/10 370/229 |
| 2010/0226250 A1* | 9/2010 | Plamondon | H04L 47/10 370/230 |
| 2011/0099631 A1* | 4/2011 | Willebeek-LeMair | H04L 43/028 726/23 |
| 2011/0131646 A1* | 6/2011 | Park | H04L 63/1458 726/13 |
| 2011/0214157 A1* | 9/2011 | Korsunsky | H04L 63/20 726/1 |
| 2011/0238855 A1* | 9/2011 | Korsunsky | G06F 21/55 709/231 |
| 2012/0039337 A1* | 2/2012 | Jackowski | H04L 47/2441 370/392 |
| 2012/0060029 A1* | 3/2012 | Fluhrer | H04L 41/0893 713/160 |
| 2012/0078994 A1* | 3/2012 | Jackowski | H04L 47/19 709/202 |
| 2012/0117646 A1* | 5/2012 | Yoon | H04L 63/0254 726/22 |
| 2012/0170744 A1* | 7/2012 | Cheng | H04L 9/0637 380/270 |
| 2012/0230345 A1* | 9/2012 | Ovsiannikov | H04L 47/2441 370/412 |
| 2012/0240185 A1* | 9/2012 | Kapoor | H04L 63/1425 726/1 |
| 2013/0077486 A1* | 3/2013 | Keith | H04L 47/2433 370/230.1 |
| 2013/0322436 A1* | 12/2013 | Wijnands | H04L 45/20 370/389 |
| 2014/0056307 A1* | 2/2014 | Hutchison | H04L 49/552 370/394 |
| 2015/0029862 A1* | 1/2015 | Olenz | H04L 43/0882 370/236 |
| 2015/0358287 A1* | 12/2015 | Caputo, II | H04L 47/24 726/13 |
| 2016/0057116 A1* | 2/2016 | Charan | H04L 63/0471 713/153 |
| 2016/0150459 A1* | 5/2016 | Patil | H04L 45/72 370/328 |
| 2016/0226758 A1* | 8/2016 | Ashwood-Smith | H04L 45/72 |
| 2016/0294865 A1* | 10/2016 | Wei | H04L 63/1458 |
| 2016/0301618 A1* | 10/2016 | Labonte | H04L 47/522 |
| 2016/0330236 A1* | 11/2016 | Reddy | H04L 63/1466 |
| 2018/0248714 A1* | 8/2018 | Milescu | H04L 12/5601 |

* cited by examiner

TRANSPARENT BRIDGE FOR MONITORING CRYPTO-PARTITIONED WIDE-AREA NETWORK

STATEMENT REGARDING FEDERALLY SPONSORED RESEARCH OR DEVELOPMENT

This invention was made with Government support under Contract No. DE-SC0015112 awarded by the Department of Energy. The government has certain rights in this invention.

TECHNICAL FIELD

The disclosure relates to monitoring statuses of a wide-area network.

BACKGROUND

A wide-area network (WAN) may be used to transfer encrypted data packets and data flows from one trusted enclave, or a segment of an internal network defined by common security policies, to a second trusted enclave. However, the WAN is susceptible to a variety of equipment failures and cyber-attacks that may impair the connectivity provided by it to mission applications running within the user enclaves and thereby adversely impacting mission effectiveness. Some examples include packet flooding denial-of service (DoS) attacks, subversion of routing or network management protocols by malicious code embedded within routers, accidental or malicious misconfiguration of routers or switches, and network device failures. Since the WAN may not be controlled by any of the trusted enclaves, operations must be performed within the enclaves using plain-text-side and overlay routing to affect paths on the cipher-text WAN. Some existing approaches use a fully distributed network optimization technique based on cooperative game theory. Such approaches seek to allocate network resources to competing data flows in a manner that maximizes the cumulative network performance. However, this may be inefficient for user datagram protocol (UDP) based applications, such as video streaming, and multicast data flows.

SUMMARY

This disclosure is directed to monitoring and protecting a crypto-partitioned, or cipher-text, WAN against accidental or maliciously induced impairments. A first computing device may be situated in a plain-text portion of a trusted first enclave behind a first inline network encryptor (INE). A second device may be positioned in a plain-text portion of a second enclave behind a second INE. The two enclaves may be separated by a cipher-text WAN, over which the two enclaves may communicate. The first computing device may receive a data packet from the second computing device. The first computing device may then determine contents of a header of the data packet. The first computing device may, based at least in part on the contents of the header of the data packet, determine a status of the cipher-text WAN and perform an operation to correct any errors present in the cipher-text WAN based on the determined status.

In one example, the disclosure describes a method including receiving, by a first computing device in a plain-text portion of a first enclave behind a first inline network encryptor (INE), a data packet from a second computing device in a plain-text portion of a second enclave behind a second INE via a cipher-text wide-area network (WAN). The first enclave further includes a first group of one or more client devices. The second enclave further includes a second group of one or more client devices. The first group of one or more client devices communicate through the cipher-text WAN via the first computing device. The second group of one or more client devices communicate through the cipher-text WAN via the second computing device. The first computing device communicates with the second computing device using the cipher-text WAN. The method further includes determining, by the first computing device, contents of a header of the data packet. The method also includes determining, by the first computing device and based at least in part on the contents of the header of the data packet, a status of the cipher-text WAN.

In another example, the disclosure describes a first computing device positioned in a plain-text portion of a first enclave behind a first inline network encryptor (INE). The first computing device includes two or more interfaces. At least a first interface is configured to communicate with a first group of one or more client devices in the first enclave and at least a second interface is configured to communicate with a cipher-text wide-area network (WAN). The first computing device further includes one or more processors. The one or more processors may be configured to receive a data packet from a second computing device in a plain-text portion of a second enclave behind a second INE via the cipher-text WAN. The second enclave further includes a second group of one or more client devices. The first group of one or more client devices communicate through the cipher-text WAN via the first computing device. The second group of one or more client devices communicate through the cipher-text WAN via the second computing device. The first computing device communicates with the second computing device using the cipher-text WAN. The one or more processors may be further configured to determine contents of a header of the data packet and determine, based at least in part on the contents of the header of the data packet, a status of the cipher-text WAN.

In another example, the disclosure describes a computer-readable medium storing instructions that, when executed, cause one or more processors of a first computing device positioned in a plain-text portion of a first enclave behind a first inline network encryptor (INE) to receive a data packet from a second computing device in a plain-text portion of a second enclave behind a second INE via a cipher-text wide-area network (WAN). The first enclave further includes a first group of one or more client devices. The second enclave further includes a second group of one or more client devices. The first group of one or more client devices communicate through the cipher-text WAN via the first computing device. The second group of one or more client devices communicate through the cipher-text WAN via the second computing device. The first computing device communicates with the second computing device using the cipher-text WAN. The instructions may further cause the one or more processors to determine contents of a header of the data packet and determine, based at least in part on the contents of the header of the data packet, a status of the cipher-text WAN.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
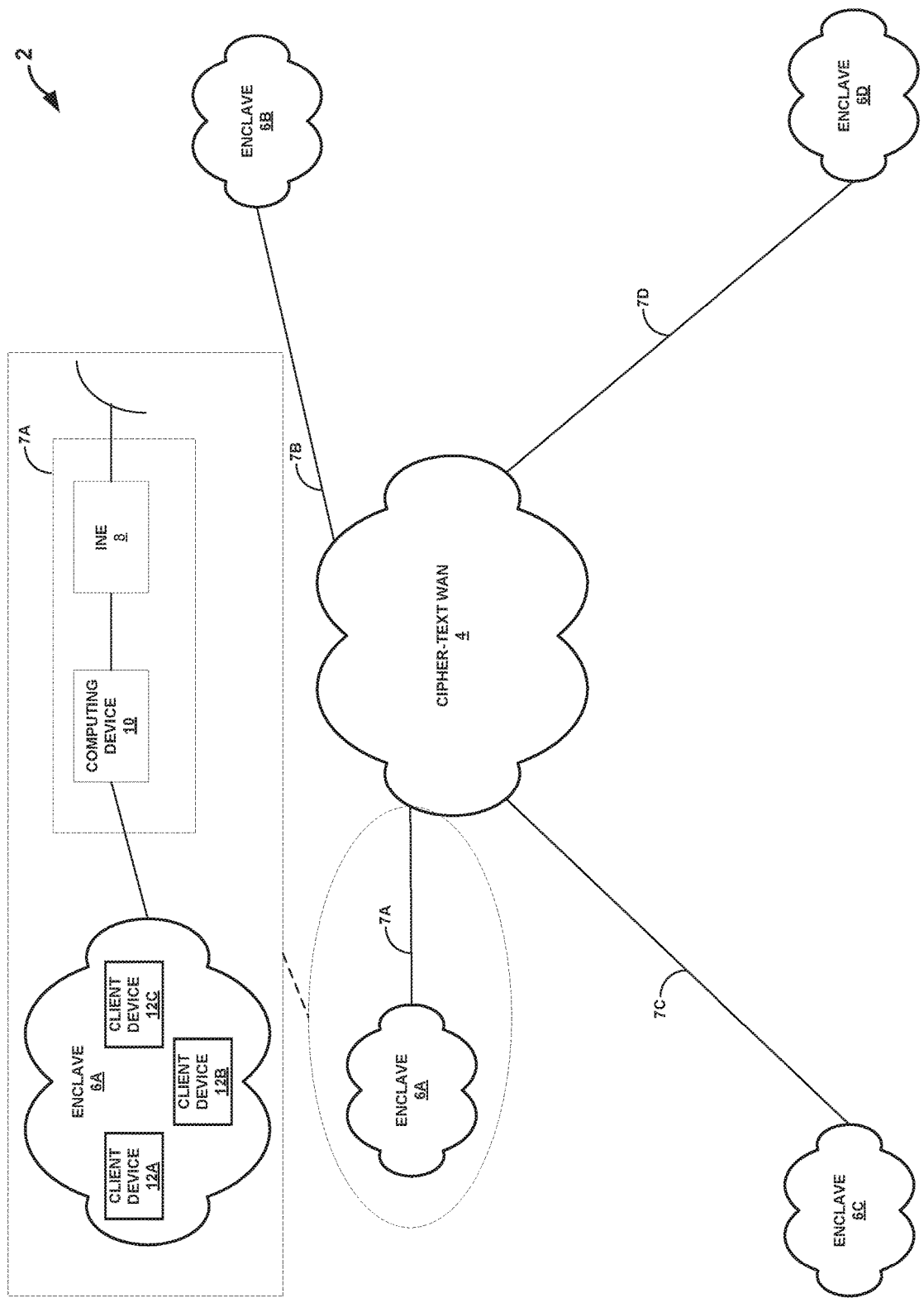
FIG. 1 is a block diagram illustrating a plurality of enclaves connected by a cipher-text WAN, where each of the enclaves has a computing device configured to monitor a status of the cipher-text WAN in accordance with one or more techniques of this disclosure.

This disclosure describes a computing device that acts as a network appliance for enabling robust and resilient operation of applications over a crypto-partitioned, or cipher-text, wide-area network (WAN) infrastructure experiencing accidental failures, network misconfigurations, cyber-attacks, equipment failures, or other faults. The computing device may reside within the plain-text side of a user enclave behind an encryption device (e.g., an inline network encryptor (INE)) and operates as a transparent bridge that passively monitors traffic, including Internet Protocol (IP) traffic and other peer-to-peer traffic, entering and leaving the respective enclave to infer the onset or occurrence of network events which could adversely impact mission applications. The computing device may, in some instances, take actions to mitigate the impact of these network events in a manner that best benefits the mission as a whole.

In general, this disclosure is directed to monitoring and correcting a cipher-text WAN, which may be any network or group of routers between INE devices that various enclaves utilize to transfer data between enclaves. The first computing device, described above, may be configured to communicate with a first group of one or more client devices in the first enclave and with the cipher-text WAN. The first computing device, which may operate as a transparent bridge device, may further be configured to receive a data packet from a second computing device in a plain-text portion of a second enclave via the cipher-text WAN. The second enclave further includes a second group of one or more client devices. The second group of one or more client devices communicate through the cipher-text WAN via the second computing device. The first computing device communicates with the second computing device using the cipher-text WAN. The first computing device may be further configured to determine contents of a header of the data packet and determine, based at least in part on the contents of the header of the data packet, a status of the cipher-text WAN. For instance, with the contents of the header, the first computing device may use a single data packet or a series of data packets to derive measurements, such as transit time, path taken, etc.

Rather than relying on an implicit signaling mechanism, the techniques described herein provide computing devices that act as network appliances with a signaling mechanism that enables the computing devices to share locally sensed network state information with one another to determine statuses of the cipher-text WAN while remaining computationally simple and efficient. This, in combination with a congestion prevention strategy and a transport layer independent overlay routing mechanism, enables the computing device to address unique challenges associated with tactical cipher-text WAN environments. The techniques of this disclosure enable a computing device to perform recovery from network events providing a large Normalized Cumulative Network Performance (CNP), such as of 95% or more. The techniques described herein further enable a computing device to quickly restore network connectivity after a network event, such as within 10 seconds of outage. Further, a computing device that performs the techniques described herein may perform with a small average network overhead, such as less than 10 Kbps or 1% of access link capacity.

FIG. 1 is a block diagram illustrating a system 2 with a plurality of enclaves 6A-6D (collectively, "enclaves 6") connected by cipher-text WAN 4, where each of the enclaves has a computing device configured to monitor a status of the cipher-text WAN in accordance with one or more techniques of this disclosure. While there could be other configurations, an example of a basic structure for system 2 is illustrated in FIG. 1. Each of enclaves 6 may include one or more client devices 12A-12C (collectively, "client devices 12"). Client devices 12 could be stationary computing devices or mobile computing devices.

1e;.5qEach of enclaves 6 is further connected to cipher-text WAN 4 via respective connection 7A-7D (collectively, "connections 7"). Each of connections 7 includes a respective Inline Network Encryptor (INE), i.e., INE 8 and computing device 10. INE 8 may be an encryption device that receives plain-text (i.e., unencrypted) data packets from client devices 12 via computing device 10. INE 8 may then encrypt the data packets according to an encryption protocol and send the data packets to another one of enclaves 6 via cipher-text WAN 4. INE 8 may also receive encrypted data packets from another one of enclaves 6 via cipher-text WAN 4. INE 8 may decrypt the received packets and forward them to one of client devices 12 via computing device 10. In general, INE 8 fronting enclave 6A encrypts all IP traffic originating from that enclave and transports the IP traffic over secure Internet protocol security (IPsec) tunnels to the respective INEs fronting respective destination enclaves 6 which decrypt these data packets before forwarding them to the hosts residing behind them. INE 8 is configured to prevent bypass of any data from a plain-text (PT) network interface to a cipher-text (CT) interface, except for multicast join messages. Examples of INE 8 include High Assurance IP Encryptors (HAIPEs) or commercial solutions for classified (CSfC) virtual private network (VPN) gateways.

Each of connections 7 may be configured to transmit certain bandwidths of data. For instance, connections 7A, 7C, and 7D may include 100 Mbps fiber optic links. Similarly, connection 7B may include a 1 Mbps satellite communication (SATCOM) link that connects to cipher-text WAN 4.

Cipher-text WAN 4 may include a global scale network of routers interconnected by high-capacity fiber optic links which may carry substantial background traffic origination from sources other than the user enclaves protected by computing device 10. Furthermore, routes through cipher-text WAN 4 may be asymmetric and cipher-text WAN 4 may not provide differentiated services to packet flows based on packet classification techniques such as differentiated service (DiffServ) code point (DSCP) markings, source address, destination address, traffic type, or any combination of these parameters.

In some examples, computing device 10 may be a physical computer or appliance that includes at least two network interfaces. One network interface may receive traffic coming from INE 8 and one network interface may receive traffic coming from client devices 12. In this way, computing device 10 may be configured as a bridge and may monitor traffic passing through computing device 10. Computing device 10 may further include a display device that is configured to output graphical user interfaces, such as for a software-based or a web-based application. A user of computing device 10 may utilize computing device 10 and the graphical user interfaces to make various adjustments to incoming and outgoing traffic flows, in accordance with techniques of this disclosure.

Computing device 10 is positioned the plain-text portion of enclave 6A, as shown in FIG. 1. Computing device 10 is directly connected to the plain-text interface of INE 8, and computing device 10 fronts all the other equipment (e.g., routers and client devices 12) residing behind INE 8 in enclave 6A. Generally, computing device 10 may monitor all plain-text IP traffic entering and leaving enclave 6. Computing device 10 may operate as a transparent bridge device between the plain-text interface of INE 8 and the rest of plain-text enclave 6A. This "bump in the wire" design, meaning that computing device 10 may receive data packets in the normal transmission flow from the source of the data packets and may forward the data packets towards the intended destination without redirection, of computing device 10 has many benefits. First, computing device 10 requires minimal changes to the software or to the configuration of any of the hosts, client devices 12, routers, and other equipment on enclave 6A. Computing device 10 may also accommodate diverse types of client devices (e.g., client devices 12) and network devices within the user enclaves. Computing device 10 may simplify the logistics for maintaining and managing equipment, as it may be a transparent bridge device. Finally, computing device 10 may be less susceptible to malware infections compared to host-based software. Computing device 10 may be designed to operate without having any knowledge of the architecture of cipher-text WAN 4 except for what computing device 10 can autonomously infer from observations of the IP traffic entering and leaving enclave 6A. Computing device 10 may operate without communicating directly (or via INE 8) with the control or management planes of cipher-text WAN 4 or with an administrator of cipher-text WAN 4.

Cipher-text WAN 4 may be susceptible to a variety of equipment failures and cyber-attacks impairing the connectivity provided to mission applications running within enclaves 6, thereby adversely impacting mission effectiveness. Some examples of failures and cyber-attacks include packet flooding denial-of service (DoS) attacks, subversion of routing or network management protocols by malicious code embedded within routers, accidental or malicious misconfiguration of routers or switches, and network device failures. These and other forms of network disruptions may be referred to collectively as "network events".

Operating in system 2 described above, computing device 10 may enable rapid recovery from network events occurring in cipher-text WAN 10. Computing device 10 may detect the occurrence or onset of network events and take actions to mitigate their impact in a fashion that increases mission effectiveness as measured by the normalized Cumulative Network Performance, which may be defined as:

$$\text{Normalized Cumulative Network Performance } (CNP) = \frac{1}{CNP_0} \sum_{tasks} r_i p_i(t_i)$$

$CNP_0$=Maximum achievable CNP value during network event $r_i$=rank/priority of network task i (larger number is higher priority)

$p_i(t_i)$=performance utility (PerfUtil) function for networking task i $t_i$=completion time of networking task i In accordance with techniques of this disclosure, computing device 10 may receive a data packet from a second computing device in a plain-text portion of a second enclave (e.g., enclave 6B) via cipher-text WAN 4. For instance, a host device in enclave 6B may send a flow of data packets to client device 12A in enclave 6A via the second computing device and cipher-text WAN 4. Computing device 10, acting as a transparent bridge for all incoming and outgoing IP traffic, may receive the flow of data packets as it is transmitted to client device 12A.

Computing device 10 may determine contents of a header of the data packet. The contents of the header of the data packet may include any one or combination of a timestamp for the data packet, a connection state for host enclave 6B, a priority of the associated flow, or any other information descriptive of either the host device, host enclave 6B, or the flow itself. For instance, in some examples, the host device from which the flow originates may populate the header of the data packet with the descriptive information. In other instances, the second computing device fronting host enclave 6B may instead populate the header of the data packet.

Computing device 10 may determine a status of cipher-text WAN based at least in part on the contents of the header of the data packet. In other words, based on the descriptive information inserted into the headers by either the host device or the second computing device in enclave 6B, computing device 10 may be capable of detecting a status or an occurrence of a network event within cipher-text WAN 4. Detailed examples of computing device 10 and how computing device 10 may determine such statuses are provided below.

Figure 2:
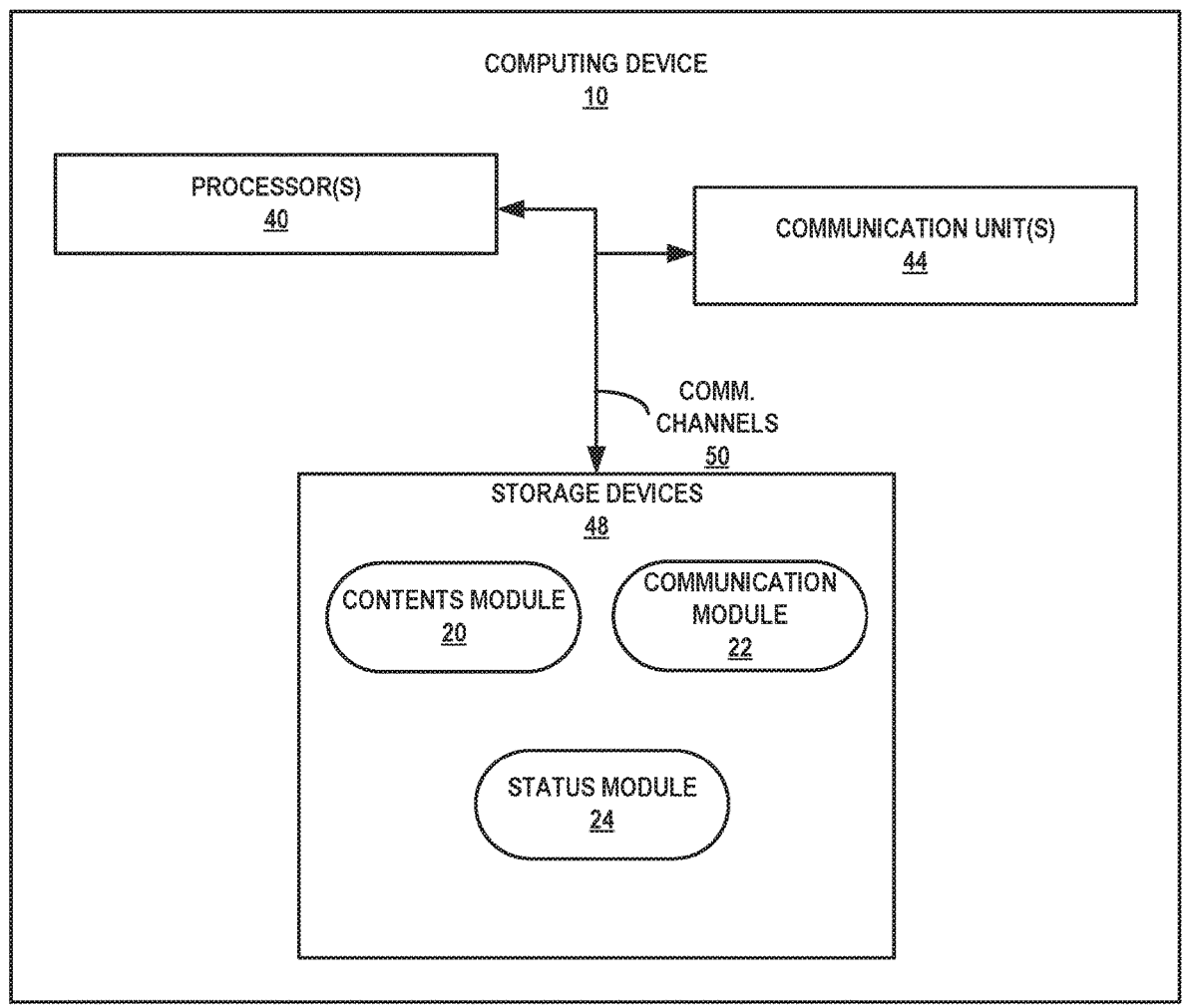
FIG. 2 is a block diagram illustrating the computing device that monitors the status of the cipher-text WAN in greater detail in accordance with one or more techniques of this disclosure.

FIG. 2 is a block diagram illustrating computing device 10 that monitors the status of cipher-text WAN 4 in accordance with one or more techniques of this disclosure. Computing device 10 of FIG. 2 is described below within the context of system 1 of FIG. 1. FIG. 2 illustrates only one particular example of computing device 10 and many other examples of computing device 10 may be used in other instances. Computing device 10 of FIG. 2 may include a subset of the components included in example computing device 10 or may include additional components not shown in FIG. 2.

As shown in the example of FIG. 2, computing device 10 includes one or more processors 40, one or more communication units 44, and one or more storage devices 48. Storage devices 48 of computing device 10 also include contents module 20, communication module 22, and status module 24. One or more processors 40 may implement functionality and/or execute instructions within computing device 10. For example, processors 40 on computing device 10 may receive and execute instructions stored by storage devices 48 that execute the functionality of contents module 20, communication module 22, and status module 24. These instructions executed by processors 40 may cause computing device 10 to determine a status of a connected cipher-text WAN (e.g., cipher-text WAN 4), within storage devices 48 during program execution. That is, contents module 20, communication module 22, and status module 24 may be operable by processors 40 to perform various actions or functions of computing device 10, for instance, determining a status of a connected cipher-text WAN.

Contents module 20, communication module 22, and status module 24 may rely on information received by communication units 44. In other words, as is described in more detail below, modules 20-24 may be operable by processors 40 to perform operations on information received by communication units 44 from an outside computing device or cipher-text WAN 4. Although shown as software modules in the example of FIG. 2, computing device 10 may execute the functions for performing the techniques of this disclosure using firmware, an application-specific integrated circuit (ASIC), or some combination of firmware, software, and ASICs.

Communication channels 50 may interconnect each of the components 20, 22, 24, 40, 44, and 48 for inter-component communications (physically, communicatively, and/or operatively). In some examples, communication channels 50 may include a system bus, a network connection, an inter-process communication data structure, or any other method for communicating data.

One or more communication units 44 of computing device 10 may communicate with external devices via one or more wired and/or wireless networks by transmitting and/or receiving network signals on the one or more networks. Each communication unit 44 may include multiple ports for receiving and/or sending traffic flows to outside devices, such as a client device or an INE. Examples of communication unit 44 include a network interface card (e.g., an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more storage devices 48 within computing device 10 may store information for processing during operation of computing device 10 (e.g., computing device 10 may store data that modules 20, 22, and 24 access during execution at computing device 10). In some examples, storage device 48 may function as a temporary memory, meaning that one purpose of storage device 48 is not long-term storage. Storage devices 48 on computing device 10 may configured to include short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48 may also be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20, 22, and 24.

Prior to the start of a mission, or a data transmission sequence, each computing device 10 may be configured with information about the mission data flows. i.e., the mission priority and performance utility (PerfUtil function) of each application-level IP data flow traversing the user enclaves, where a flow is identified by its source IP address, destination IP address, source port, and destination port. A graphical user interface (GUI) output by computing device 10 may enable a network operator to create a configuration file with this information at one enclave which can then be used to configure the appliances at the other enclaves. Also, each computing device 10 is configured with the bandwidth of the access link connecting its user enclave to cipher-text WAN 4. The GUI may also enable manual override of the automated operation of the appliances as well as partially automated, human-assisted operation by providing a command and control capability for operator intervention in the mitigation actions taken by computing device 10 in response to network events.

In accordance with techniques of this disclosure, communication module 22 of computing device 10 may receive, via communication units 44, a data packet from a second computing device in a plain-text portion of a second enclave via the connected cipher-text WAN. For instance, a host device in a second enclave may send a multicast flow that includes a client device in the same enclave as computing device 10 via the second computing device and the connected cipher-text WAN. Computing device 10, acting as a transparent bridge for all incoming and outgoing IP traffic, may receive the multicast flow of data packets as it is transmitted to the client device.

Contents module 20 of computing device 10 may determine contents of a header of the data packet. The contents of the header of the data packet may include any one or combination of a timestamp for the data packet, a connection state for the flow's host enclave, a priority of the associated flow, or any other information descriptive of either the flow's host device, the flow's host enclave, or the flow itself. For instance, in some examples, the host device from which the flow originates may populate the header of the data packet with the descriptive information. In other instances, the second computing device fronting the flow's host enclave may instead populate the header of the data packet.

Status module 24 of computing device 10 may determine a status of the connected cipher-text WAN based at least in part on the contents of the header of the data packet. In other words, based on the descriptive information inserted into the headers by either the host device or the second computing device in the flow's host enclave, computing device 10 may be capable of detecting a status or an occurrence of a network event within cipher-text WAN 4.

For instance, the status may be a bottleneck at the first enclave with computing device 10. In such instances, communication module 22 may receive a first data flow from the second computing device. Communication module 22 may further receive a second data flow from a third computing device in a plain-text portion of a third enclave via cipher-text WAN 4. Communication module 22 may also receive, as part of the second data flow, a second data packet from the third computing device via cipher-text WAN 4. Status module 24 may determine that a combined bandwidth of the two data flows exceeds a maximum bandwidth for the first enclave. Responsive to determining that a first bandwidth of the first data flow combined with a second bandwidth of the second data flow exceeds a maximum bandwidth for the first enclave, status module 10 may determine, based at least in part on the first timestamp, that the status of cipher-text WAN 4 is a bottleneck at the first enclave.

In such instances, to correct this status, responsive to determining that the status of cipher-text WAN 4 is the bottleneck, contents module 20 may determine a first priority of the first data flow and a second priority of the second data flow. Contents module 20 may then compare the first priority and the second priority. Responsive to contents module 20 determining that the first priority is greater than the second priority, communication module 22 may squelch the second data flow from the third computing device. Conversely, responsive to contents module 20 determining that the second priority is greater than the first priority, communication module 22 may squelch the first data flow from the second computing device.

However, responsive to contents module 20 determining that the first priority is equal to the second priority, contents module 20 may further determine a first time indicated by the first timestamp and a second time indicated by a second timestamp located in contents of a header of the second data packet. Contents module 20 may then compare the first time and the second time. Responsive to contents module 20 determining that the first time is earlier than the second time, communication module 22 may squelch the second data flow from the third computing device. Conversely, responsive to contents module 20 determining that the second time is earlier than the first time, communication module 22 may squelch the first data flow from the second computing device. For the purposes of this disclosure, squelching a data flow includes sending a data packet to the host computing device of the data flow, where the data packet includes an indication for the host computing device to cease sending the data flow to the receiving computing device (e.g., computing device 10). Responsive to computing device 10 determining that there is enough bandwidth to receive the squelched data flow, communication module 22 may send another data packet to the host computing device that includes an indication for the second computing device to resume sending the squelched data flow to computing device 10.

In other instances, the status may be a performance latency, or an excessive delay in the transmission of data packets across cipher-text WAN 4. In such instances, communication module 22 may receive a bulk data transfer from the second computing device. Communication module 22 may also receive a data flow from the second computing device. In this instance, the first data packet is associated with the data flow. Contents module 20 may then determine, based at least in part on the timestamp of the data packet, a delay for the data flow by finding the difference between the timestamp of the data packet and a current time. Responsive to contents module 20 determining that the delay for the data flow is above a threshold delay, status module 24 may determine that the status of cipher-text WAN 4 is a performance latency. To correct this status, communication module 22 may then send a second data packet to the second computing device that includes an indication for the second computing device to re-route the data flow through a third computing device in a plain-text portion of a third enclave. Communication module 22 may then receive the data flow from the third computing device.

In other instances, the status may be a faulty connection between the enclave containing computing device 10 (i.e., enclave 6A) and a third enclave, meaning that enclave 6A may not be capable of receiving data from the third enclave. In such instances, contents module 20 may determine, based at least in part on a connection state in the data packet received from the second computing device, that the second computing device is connected to a third computing device in a plain-text portion of a third enclave. Contents module 20 may then determine that the first computing device is not currently receiving an expected data flow from the third computing device. As a result, status module 24 may determine that the status of cipher-text WAN 4 is a faulty connection between first enclave 6A and the third enclave.

To correct this status, communication module 22 may send a second data packet to the second computing device that includes an indication for the second computing device to receive the expected data flow from the third computing device and to send the expected data flow to computing device 10. Communication module 22 may then receive the expected data flow from the second computing device.

In still other instances, that status may be a malicious configuration of one or more routers in cipher-text WAN 4, causing data to only be transferred unidirectionally between enclave 6A and another enclave. In such instances, contents module 20 may determine, based at least in part on a connection state in the data packet received from the second computing device, that the second computing device is unidirectionally connected to the first computing device (i.e., the second computing device can send data to the first computing device but cannot receive data from the first computing device) and that the second computing device is bidirectionally connected to a third computing device in a plain-text portion of a third enclave (i.e., the second computing device can both send and receive data to and from the third computing device). Status module 24 may determine that the status of cipher-text WAN 4 is a malicious configuration of one or more routers in cipher-text WAN 4. To correct this status, communication module 22 may send a second data packet to the third computing device that includes an indication for the second computing device to send a data flow to computing device 10, as computing device 10 cannot directly send the data packet to the second computing device. Communication module 22 may then receive the data flow from the second computing device.

In other instances, the status of cipher-text WAN 4 may be a dropped direct connection between enclave 6A and a third enclave, meaning that enclave 6A cannot send data packets directly to or receive data packets directly from the third enclave, rather than only being unable to receive the data packets from the third enclave. In such instances, contents module 20 may determine, based at least in part on a connection state in the data packet received from the second computing device, that a third computing device in a plain-text portion of a third enclave has lost connection with computing device 10. Status module 24 may then determine that the status of cipher-text WAN 4 is a dropped direct connection between first enclave 6A and the third enclave. To correct this status, contents module 20 may then determine, based at least in part on the connection state in the data packet received from the second computing device, a multi-hop route between first enclave 6A and the third enclave. The multi-hop route may include a sequence of one or more connected enclaves that connect first enclave 6A to the third enclave. Communication module 22 may then send a data flow intended for the third computing device to a first connected enclave of the sequence of one or more connected enclaves.

In still other instances, the status of cipher-text WAN 4 may be a misconfiguration of a rendezvous point within cipher-text WAN 4, meaning that the rendezvous point may not be forwarding a multicast flow to enclave 6A correctly. In such instances, content module 20 may determine, based at least in part on a connection state in the data packet received from the second computing device, that the second computing device is connected to computing device 10. Communication module 22 may also determine that the computing device 10 is not currently receiving an expected multicast flow from the second computing device. As such, status module 24 may determine that the status of cipher-text WAN 4 is a misconfiguration of a rendezvous point within cipher-text WAN 4. To correct this status, communication module 22 may attempt to recover a connection to a multicast tree for the second computing device.

In other instances, the status of cipher-text WAN 4 may be a general excessive data packet loss caused by one of a cyber-attack or a misconfiguration of a router in cipher-text WAN 4 (e.g., the router may be forwarding data packets to the wrong IP address). In such instances, content module 20 may determine, based at least in part on a connection state in the data packet received from the second computing device, that the second computing device is connected to computing device 10. Communication module 22 may receive a multicast flow from the second computing device. When receiving the multicast flow, communication module 22 may determine a packet loss rate for the data flow. Communication module 22 may further determine that the packet loss rate exceeds a threshold packet loss rate. Responsive to communication module 22 determining that the packet loss rate exceeds the threshold packet loss rate, status module 24 may determine that the status of cipher-text WAN 4 is one of a cyber-attack or a misconfiguration of a router in cipher-text WAN 4. To correct this status, communication module 22 may attempt to restore a cumulative network performance for the multicast flow.

In still other instances, the status of cipher-text WAN 4 may be a packet flooding attack on first enclave 6A, where a malicious source sends unexpected data packets to enclave 6A at a high rate. In such instances, communication module 22 may receive a data flow from the second computing device. Contents module 20 may determine a first delay for the data flow. Contents module 20 may further determine that the first delay exceeds a threshold delay. Responsive to contents module 20 determining that the first delay exceeds the threshold delay, contents module 20 may determine, based at least in part on the connection state in the data packet received from the second computing device, that the first computing device is connected to a third computing device in a plain-text portion of a third enclave. Communication module 22 may send a second data packet to the second computing device that includes an indication for the second computing device to send the data flow to the first computing device via the third computing device. Communication module 22 may then receive the data flow from the third computing device. Contents module 20 may then determine a second delay for the data flow. Responsive to contents module 20 determining that the second delay does not exceed the threshold delay, communication module 22 may continue to receive the data flow from the third computing device. Conversely, responsive to contents module 20 determining that the second delay also exceeds the threshold delay, status module 24 may determine that the status of cipher-text WAN 4 is a packet flooding attack on first enclave 6A. To correct this status, communication module 22 may initiate a filtering process to resolve the packet flooding attack.

In other instances, the techniques of this disclosure may be utilized to send a deadline-critical data flow, or a data flow that must be received by a certain time in order to maintain performance. In such instances, content module 20 may determine, based at least in part on 1 connection state in the data packet received from the second computing device, a multi-hop route between first enclave 6A and the second enclave. The multi-hop route may include a sequence of one or more connected enclaves that connect first enclave 6A to the second enclave. Communication module 22 may then send a deadline-critical data flow directly to the second computing device. Communication 22 may also simultaneously send the deadline-critical data flow to the second computing device via the multi-hop route.

In still other instances when the contents of the header include a priority of an associated data flow to the second enclave and the associated data flow is part of a multicast stream originating in first enclave 6A, techniques of this disclosure may handle multicast flows with excessive bandwidth usage. In such instances, communication module 22 may receive an additional data packet from each of one or more additional enclaves. The respective contents of a respective header of the respective additional data packet include a respective priority of a respective associated data flow to the respective enclave of the one or more additional enclaves, and each respective associated data flow is part of the multicast stream originating in the first enclave. Further, each associated data flow may have a same bandwidth usage. Contents module 20 may determine a total bandwidth usage for the multicast stream as a sum of the respective bandwidth usage for each of the respective data flows. Contents module 20 may determine that the total bandwidth usage is greater than an available outgoing bandwidth for first enclave 6A. Responsive to contents module 20 determining that the total bandwidth usage for the multicast stream is greater than the available outgoing bandwidth for first enclave 6A, communication module 22 may squelch, based at least in part on the respective priority of the respective associated data flow to each of the one or more additional enclaves and the second enclave, respective data flows with the lowest respective priorities until the total bandwidth usage for the multicast stream is less than or equal to an available outgoing bandwidth. Upon communication module 22 completing a transmission of a respective data flow, communication module 22 may reactivate the previously squelched data flow with the highest respective priority.

Status module 24 of computing device 10 detects the occurrence of network events or disruptions in the connectivity service provided by cipher-text WAN 4 to the user applications running in enclave 6A. Specifically, status module 24 may detect a failure of IPsec tunnels providing point-to-point connectivity between peer enclaves over a direct WAN route between the peer enclaves. Such failures could include the failure of a tunnel in both directions or just one direction between the two affected enclaves. Status module 24 may also detect failure of the multicast service between a sender and one or more receivers of the multicast packet stream. Status module 24 may further detect abnormal packet losses which can be identified at the granularity of a single application packet flow or at the granularity of an IPsec tunnel carrying multiple application flows between user enclaves. Status module 24 may also detect abnormal packet delays suffered by packets associated with a specific application level flow or the aggregated flow carried on an IPsec tunnel between two enclaves. Status module 24 also may detect bandwidth depletion of the access link for the local enclave because of packet flooding attacks or other causes.

In detecting inter-enclave IPsec tunnel failures, status module 24, using a lightweight, bandwidth-efficient signaling protocol, may exchange its local view of the status of IPsec tunnels with the computing device in the peer enclaves. Status module 24 then combines the state information received from the remote computing devices with its local view to derive a global view or mosaic of the state of each of the n*(n−1) direct tunnels between the user enclaves, where n is the total number of enclaves in the mission.

Specifically, computing device 10 at an enclave (e.g., enclave 6A) may maintain a list of all the remote enclaves from which it has received one or more IP packets within the previous 7 seconds over the point-to-point IPsec tunnel between the two enclaves. Computing device 10 may then exchange this list with each of its remote peer appliances, such that each peer gets an update at least once every 2 seconds under normal operating conditions. Computing device 10 may use the absence of IP traffic from a remote enclave over a 7 second period to detect the loss of the tunnel in the incoming direction (i.e., from the remote enclave to enclave 6A). Computing device 10 may then fuse the local tunnel state reports received from the remote enclaves to form a network-wide picture of the up/down status of all the point-to-point tunnels between all the user enclaves in each direction. Upon detecting the loss of a tunnel between any two enclaves, this network event is reported by communication module 22 to status module 24, which determines what mitigation action to take, if needed.

The exchange of such local state between the enclaves is accomplished over the unicast IPsec tunnels between the enclaves. Multicast may not be used even, if supported natively by the respective INEs, since multicast failure detection relies on the state exchange mechanism. Therefore, the use of multicast for state exchange may introduce an undesirable circular design dependency.

The technical challenge in this scenario is to implement such state sharing among the enclaves while keeping the network overhead under the 10 Kbps budget for SATCOM links for a 12 enclave network. The minimum size of an IPsec encapsulating security payload (ESP) packet transmitted by an enclave is 124 bytes, assuming AES encryption with SHA-1 for integrity protection. SHA-1 may require payload blocks aligned at 64-byte boundaries where padding bytes may be added to the payload, as needed, to achieve this alignment. So a minimum size packet would consist of 60 bytes used for the IPsec tunnel header, ESP header and ESP trailer and 64 bytes for the ESP payload where the latter may include padding bytes. For commercial solutions for classified (CSfC) (or layered VPN) INEs, the minimum packet size for encrypted traffic may be 188 bytes.

For a HAIPE-based network environment with 12 enclaves, if the local state information from an enclave can be packed into a 124-byte packet transmitted by an enclave to each of its 11 peers, the network overhead experienced by each link (in each direction) for each such exchange may be 11*124*8=10.9 Kbits. If such exchange is performed at a maximum frequency of 1 message every 2 seconds, then the overhead for each link would be a maximum of 5.45 Kbits/second, i.e., well under the 10 Kbps budget.

The challenge then is to pack the tunnel state data exchanged between the enclaves into a single 124-byte encrypted packet. The techniques described herein addresses this by employing a bit-encoded representation of the locally sensed tunnel state information. For the 12-enclave network environment, each computing device that may perform the techniques described herein maintains an 11-bit vector where each bit represents the state of one of the 11 tunnels terminating at the enclave from its 11 remote peers. The bit corresponding to a tunnel is set to 1 if computing device 10 received an IP packet over that tunnel from its peer within the last 7 seconds; otherwise, it is set to 0. It is this compact, bit vector representation of the locally sensed tunnel state which is exchanged between the peer enclaves.

To conserve bandwidth usage even further, computing device 10 opportunistically embeds this 11-bit signaling message within an application data packet destined for a destination enclave in a manner that does not increase the size of the encrypted data packet leaving the enclave. Thus, state sharing may be achieved with zero network overhead. Such zero overhead signaling capitalizes on the fact that INEs typically add several bytes of padding to the ESP payload of a data packet to align the 64-byte boundary needed by crypto algorithms (e.g., advanced encryption standard (AES) with secure hash algorithm 1 (SHA-1)). These padding bytes represent wasted bandwidth on ciphertext WAN 4. Computing device 10 harvests some of this wasted bandwidth for signaling messages exchanged between the enclaves. Furthermore, computing device 10 does this without impacting the operation of INEs.

Computing device 10 may monitor the size of each packet leaving its enclave to determine if the packet would be padded by the INE with 4 or more bytes. If so, computing device 10 may add a 4-bytes IP option header to that IP packet embedding the 11-bit tunnel state vector within this header. The INE, in this case, will add 4 less bytes of padding than otherwise for this packet before encrypting and transmitting the padded packet to the destination enclave. The computing device residing behind the INE at the destination enclave will process this IP option header and remove it before forwarding the packet to the application in its user enclave. This insertion and deletion of the IP option header carrying signaling information between the appliances may be transparent to the hosts running mission applications in these enclaves. Since the maximum size of the option header is 40 bytes, computing device 10 places a limit on how much signaling information can be packed into one packet. While this is not problematic for the 12-node network environment being considered for the exemplar WAN, the techniques described herein are capable of scaling to networks with thousands of enclaves by fragmenting large state information and embedding these fragments over multiple data packets. This could be further complemented with run length encoding to achieve compactness.

Computing device 10 may send a standalone signaling packet with the locally sensed tunnel state information to a peer enclave if and only if no application data packets were sent to that peer from its enclave over the previous two seconds. Thus, the 5.45 Kbps network overhead noted above is an upper bound; the expected average network overhead for such signaling may be lower than this value.

In detecting multicast failure, computing device 10 may share the identities of the active multicast flows originating at its user enclave with each of its peers in the other enclaves at a maximum frequency of once every 4 second. Computing device 10 may process the signaling messages received from its peers to maintain a list of all the active multicast flows in cipher-text WAN 4. Computing device 10 may also maintain a list of all the multicast flows currently being received by enclave 6A, as well as information on all multicast flows currently being subscribed by applications within enclave 6A. If status module 24 detects that enclave 6A is not receiving an active multicast flow originating at a remote enclave for which there is a subscriber in enclave 6A, it signals the loss of multicast service for this flow to status module 24 to enable computing device 10 to take mitigation actions.

The technical challenge in this scenario is to detect the loss of multicast service for one or more enclaves with subscribers for an active multicast flow while minimizing network overhead of the detection mechanism. To address this problem, computing device 10 may maintain a bit vector representation of each active multicast flow originating in its enclave in a manner similar to the tunnel state information noted earlier. Computing device 10 may then exchange this information with all its peers in the other enclaves over the unicast tunnels between it and these enclaves. Computing device 10 may opportunistically embed this information within the IP option header of application data packets in a fashion similar to that for the tunnel state information noted above. Locally sensed tunnel state information and local multicast state information may be carried within the same data packet. If no data packets were sent to a peer enclave over the last 4 seconds, computing device 10 may piggyback the local multicast state information within the standalone signaling packet created by it to carry locally sensed tunnel state information. If the number of multicast flows originating within an enclave is less than 256, no additional overhead beyond that for tunnel state signaling will be incurred for such multicast signaling. For each additional 512 flows beyond this number, the upper bound on the additional overhead for multicast signaling would be 128 bits/second, assuming that the additional state information is carried within the payload portion of the IP packets carrying the tunnel state information.

In detecting abnormal packet loss, computing device 10 may maintain statistics (e.g., weighted moving average) on the data losses observed for each application level flow received by enclave 6A. Computing device 10 may also maintain these data loss statistics for each IPsec tunnel terminating at enclave 6A by aggregating the packet losses for all the application flows transported over that tunnel.

Computing device 10 may employ a novel zero network overhead mechanism for inserting sequence numbers within packets leaving enclave 6A to enable the receiver to detect packet losses. The idea underlying this mechanism is to harvest the 32-bit field within each IP packet used for handling packet fragmentation within the network (i.e., the 16-bit identification field, the 13-bit fragment offset field, and the 3-bit flag field) to carry the sequence number of packets associated with each application flow. To enable the use of this 32-bit field, computing device 10 may prevent hosts from sending packets greater than the maximum transmission unit (MTU) for the PT-side enclaves. Should a host violate this stipulation, computing device 10 at enclave 6A may send an internet control message protocol (ICMP) message to the host to reduce its packet size (ICMP code 4). With fragmentation disallowed in this fashion, this 32-bit field within the IP header of each data packet becomes available for use by computing device 10 for embedding its signals. One of these signals is the sequence number for a packet flow; computing device 10 also conveys two other signals, described below, using this field. Thus, the most significant two bits of this 32-bit field is used to describe the type of signal carried within the least significant 30 bits of this field.

The sequence number carried within the 30-bits of the harvested IP header field denotes the cumulative number of bytes transmitted for that application flow by computing device 10 at enclave 6A (including retransmitted packets in the case of TCP). Using this information, the computing device at the destination enclave calculates the data loss rate for each flow. Should the losses exceed a preset threshold for a given flow, contents module 20 of computing device 10 notifies status module 24 to enable it to take mitigation actions as needed.

In detecting abnormal packet delays, computing device 10 may enable the measurement of the one-way delay experienced by an IP packet from the appliance at enclave 6A to the computing device at the destination enclave on a per application flow basis. Also, computing device 10 may maintain statistics on the observed packet delays on a per flow and per tunnel basis for each flow entering the enclave and for each IPsec tunnel terminating at the enclave. Should the delay exceed a preconfigured threshold for a flow or a tunnel, status module 24 of the appliance is notified of the event for further action.

To enable measurement of the one-way network delay for packet with millisecond accuracy without requiring a time synchronization protocol across the enclaves, each computing device may be connected to a local GPS-based time source. Computing device 10 may use this globally synchronized external time source, to insert the milliseconds elapsed since UTC 00:00 timestamp within the 32-bit IP harvested header field (noted earlier) of a subset of the packets for each flow leaving the enclave. The least significant 30 bits of this header carries this information while the most significant two bits identifies the type of signal (i.e., source timestamp) embedded within the header. The computing device at the destination enclave for the packet then extracts this timestamp information and subtracts it from the value obtained from its local GPS synchronized clock to calculate the one-way network delay for the packet.

Status module 24 of computing device 10 may respond to network events detected by content module 20 by taking actions to mitigate the adverse impact of the network event in a manner that best benefits the mission as a whole as measured by the normalized Cumulative Network Performance (CNP) of the network. The set of actions implemented by status module 24 in response to a network event include sending signaling messages to remote computing devices to control the admission of packet flows into the network and commands to its local Configurable Protocol Stack (CPS) component (described in the next section) to modify its handling of selected packet flows as they enter and leave enclave 6A.

To implement mission-aware recovery of the applications on the user enclaves from network events in cipher-text WAN 4, status module 24 may rely on the mission priority and performance utility (PerfUtil) values configured for each application data flow prior to the start of the mission. The techniques described herein are based on the tenet that the configuration of the mission parameters such as utilities for flows should be simplified not only for ease of use but also to prevent the kind of misconfiguration problems plaguing cipher-text WAN 4 due to the latter's complexity. It may be assumed that each flow, e.g., UDP or TCP flow, may be assigned a minimum required bandwidth, below which its performance utility is zero and a desired bandwidth at or above which its performance utility is 1. Optionally, these flows may be assigned maximum tolerable values for packet loss rate and packet delays beyond which the performance utility of the flow is zero. Also, the techniques described herein may assume that all flows are assigned preemptive priorities. Thus, a flow with a higher priority will preempt a lower priority flow if the minimum required bandwidth for both contending flows cannot be accommodated on a bottleneck link.

The operation of status module 24 further relies on the Configurable Protocol Stack (CPS) performing rate-based control of all packet flows leaving an enclave (irrespective of the transport protocol used by the application). The rate for each flow is determined by status module 24 and conveyed to the Configurable Protocol Stack as described below.

Computing device 10 may implement overlay routing between enclaves for indirect paths between the source and destination which traverses one or more intermediary enclaves. The source route for an overlay path for a given packet flow is determined by status module 24 at the source enclave and conveyed to the CPS. Status module 24 may embed this source route within the IP option header of the data packet. The first two octets of the option header may contain the option type and length information respectively. The next two octets identify the source and destination enclaves for the packets (assuming a system with a maximum of 255 enclaves). The subsequent octets may be used to encode the source route for the packet to the destination where each octet identifies an enclave on the source route. Thus, overlay routing for two hop routes may be performed using an IP option header of 4 octets, since the information needed by the first hop to route the packet to the destination is implicit in the destination field within the fourth octet of the option header. In contrast, regular IP-in-IP encapsulation for such two hop routes would incur an overhead of 20 bytes per packet. For hops greater than 2, the source route information for the traditional scheme may have to carry the 4-octet IP address of each intermediate hop in the option header as opposed to one octet per hop for the techniques described herein.

Four major features of the techniques of this disclosure for mission-aware recovery from network events distinguish it from existing approaches that rely on sophisticated optimization frameworks such as cooperative game theory and network utility maximization. The techniques of this disclosure are fully distributed and provide a heuristics based approach for network resource sharing. The techniques described herein further utilize a rate based flow control in conjunction with explicit signaling among WAN appliances controlling the admission of flows into cipher-text WAN 4 from user enclaves. Further, the techniques of this disclosure provide for the use of congestion prevention techniques for handling resource contention in the access links. Finally, by implementing mechanisms directly on top of the IP layer of the network stack, the techniques of this disclosure are independent of the transport protocol (i.e., UDP or TCP) employed by the mission applications.

Figure 3:
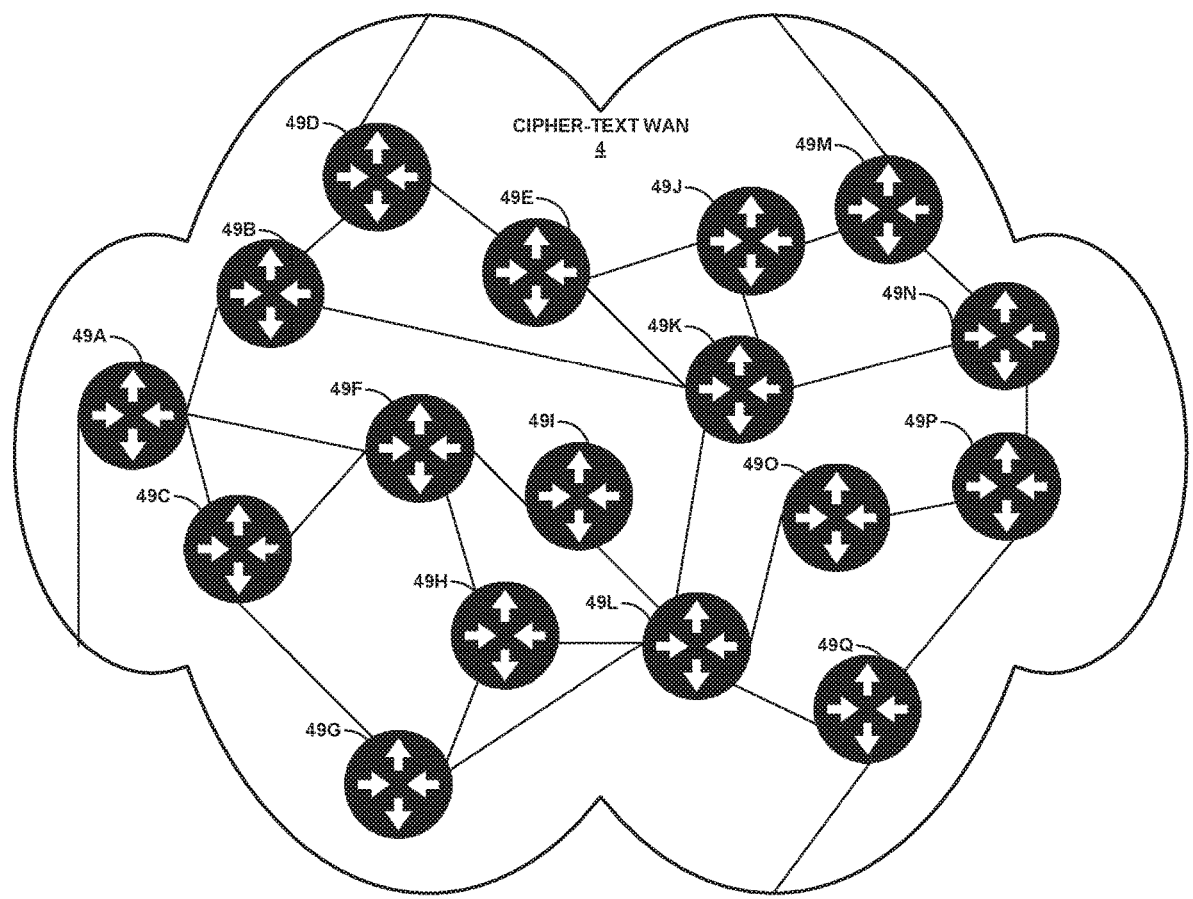
FIG. 3 is a block diagram illustrating an example cipher-text WAN in greater detail in accordance with one or more techniques of this disclosure.

FIG. 3 is a block diagram illustrating an example cipher-text WAN 4 in greater detail in accordance with one or more techniques of this disclosure. As shown in FIG. 3, cipher-text WAN 4 includes multiple routers 49A-49Q (collectively routers 49). Each of routers 49 are interconnected to one or more other routers within cipher-text WAN 4. Some routers, such as routers 49A, 49D, 49M, and 49Q may be connected to enclaves outside of cipher-text WAN 4. Routers 49A, 49D, 49M, and 49Q may receive encoded data packets from an outside enclave. The encoded data packets may have an intended destination outside of cipher-text WAN 4. As such, the receiving router 49A, 49D, 49M, or 49Q may forward the encoded data packets along a path of routers 49 towards the intended destination. FIG. 3 is only one example configuration of a cipher-text WAN. In other instances, more or fewer routers 49 may be installed within cipher-text WAN 4. In still other instances, routers 49 may have more or fewer interconnections. In other instances, more of routers 49 may have connections to the same outside enclaves. For instance, both of routers 49D and 49E may be connected to a single outside enclave.

Figure 4:
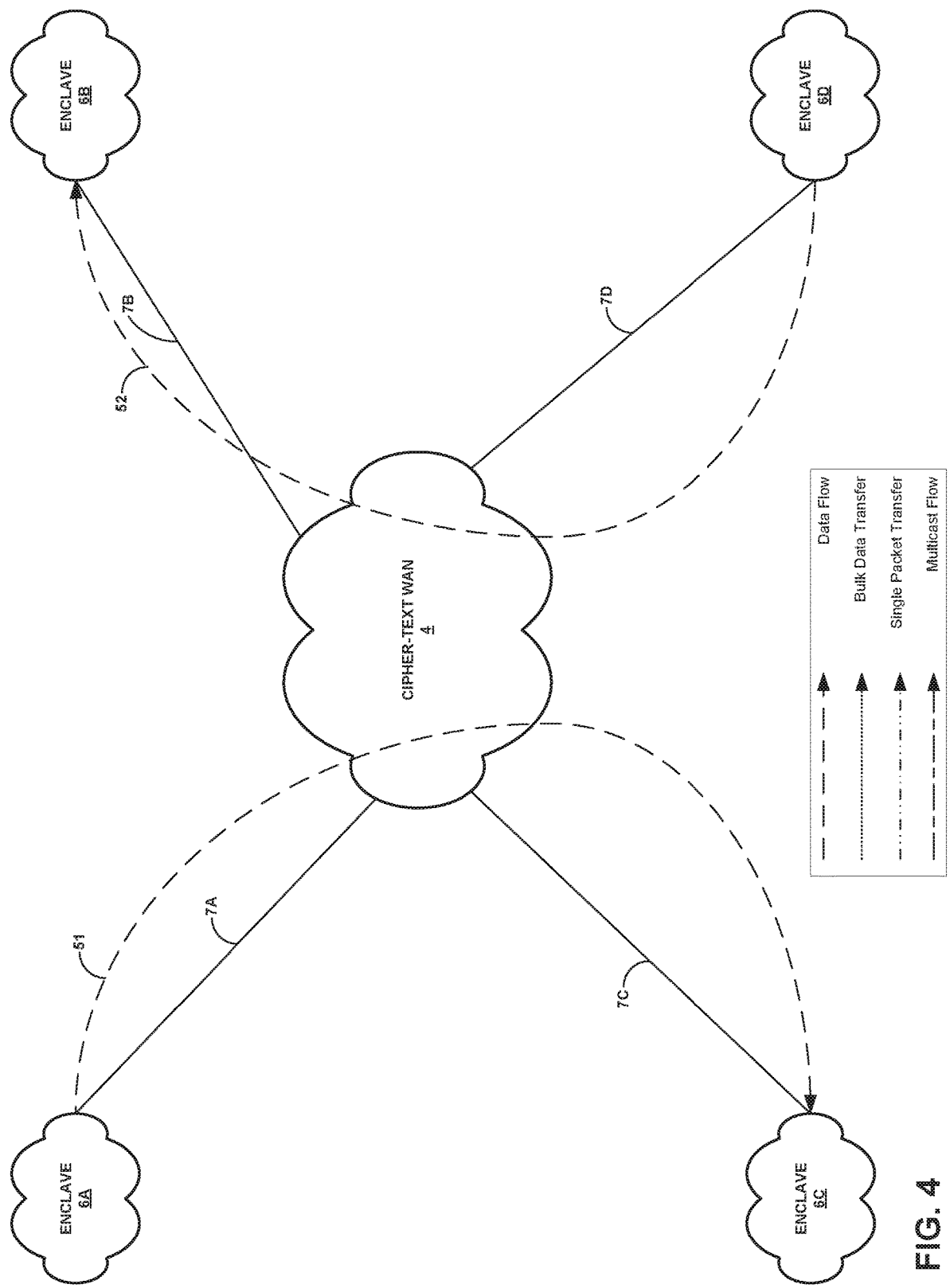
FIG. 4 is a block diagram illustrating a network with a mix of user datagram protocol (UDP) and transmission control protocol (TCP) flows in accordance with one or more techniques of this disclosure.

FIG. 4 is a block diagram illustrating a network with a mix of user datagram protocol (UDP) and transmission control protocol (TCP) flows 51 and 52, respectively, in accordance with one or more techniques of this disclosure. Referring to FIG. 4, consider the scenario where a UDP-based real-time video streaming application in first enclave 6A is sending a stream of video packets (i.e., UDP flow 51) to enclave 6C at a rate of 1 Mbps. Assume that this application is mission-critical and has a priority of 99. At the same time, a low priority file transfer application (priority=1) in enclave 6D is transferring a large (several gigabytes) file to enclave 6B via TCP flow 52. Assume that the performance utility of flow 50 is 0 if the bandwidth provided to it by cipher-text WAN 4 is less than 1 Mbps or the average packet loss experienced by flow 51 is greater than 10% over any 10 second interval. Further, the performance utility of flow 51 is 1 if cipher-text WAN 4 can provide 1 Mbps or more of bandwidth with an average packet loss rate of less than 10%. For flow 52, the performance utility is 0 for any network bandwidth allocation below 500 Kbps and is 1 for any value at or above 500 Kbps irrespective of the packet loss rate.

A network event may occur within cipher-text WAN 4. For instance, an equipment misconfiguration or a volumetric denial of service attack may occur that reduces the bandwidth provided to flow 51 or causes unacceptable packet losses on its direct path from enclave 6A to enclave 6C. Suppose the only indirect network path for flow 51 to reach enclave 6C from enclave 6A without being impacted by this network event is through enclave 6B which resides behind a 1 Mbps SATCOM access link. For this network event, the maximum achievable cumulative network performance ($CNP_0$) is 99. This is obtained by allocating the high priority flow 51 with the full 1 Mbps capacities on the uplink and downlink portions of the SATCOM link at enclave 6B, leaving the low priority file transfer application with no bandwidth. Thus, an ideal solution should achieve a CNP of 99 to provide a normalized CNP of 100%, as shown in FIG. 5.

Figure 5:
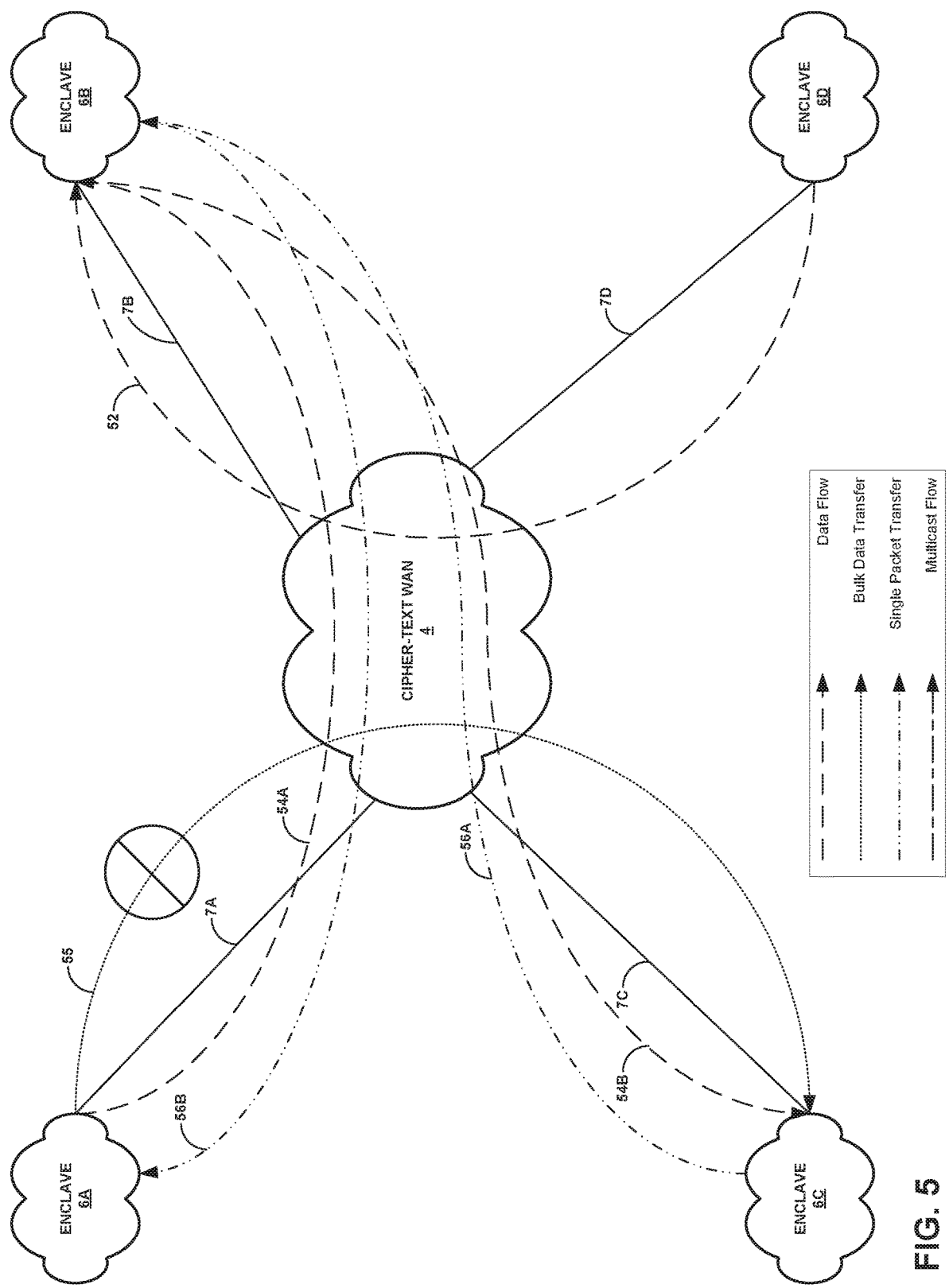
FIG. 5 is a block diagram illustrating a network where a reverse acknowledgement flow contends for bottleneck bandwidth with a forward video flow, in accordance with one or more techniques of this disclosure.

FIG. 5 is a block diagram illustrating a network where reverse acknowledgement flow 56 contends for bottleneck bandwidth with forward video flow 54, in accordance with one or more techniques of this disclosure. According to previous techniques, video flow 54 from enclave 6A to enclave 6C will be delivered over a split TCP connection, i.e., a connection from the source in enclave 6A to an intermediary in enclave 6B (flow 54A), and a TCP connection from the intermediary in enclave 6B to the receiver in enclave 6C (flow 54B), as shown in FIG. 5. Suppose video stream 54 for the source produces a WAN traffic profile consisting of about 400 IPsec ESP encapsulated TCP packets per second. Assuming that the TCP receivers in enclaves 6B and 6C acknowledge every other packet (using delayed acknowledgement), this will result in a stream of 200 ACKs per second sent from enclave 6C to enclave 6B (flow 56A) and from enclave 6B to enclave 6A (flow 56B). Each ACK packet, after encryption by the INE fronting the respective enclave, will result in a 124 byte IPsec packet (assuming AES encryption block size of 16 bytes and SHA-1 block size of 64 bytes). Thus, the SATCOM downlink from cipher-text WAN 4 to enclave 6B will see an ACK traffic load of 200×124×8 bits/second or approximately 200 Kbps from enclave 6C. This traffic will compete with the 1 Mbps video flow 54A from enclave 6A to enclave 6B, reducing its share of the bandwidth to less than 1 Mbps. As a consequence, the performance utility of video flow 54A would be reduced to 0, yielding a normalized CNP of 0 for the mission for this scenario.

The techniques of this disclosure, described above, accomplish mission-aware network bandwidth allocation for UDP as well as TCP packet flows on cipher-text WAN 4 using a fully distributed flow admission control mechanism implemented within computing devices in each respective enclave (e.g., computing device 10). The techniques described herein use explicit signaling between the computing devices, employing novel data packing techniques to ensure that network overhead for all explicit signaling messages employed by the computing devices stays within the 10 Kbps budget.

Upon being notified of a tunnel failure by its RNA, status module 24 of computing device 10 may examines the fused tunnel-based connectivity graph for cipher-text WAN 4 to determine if the disconnected enclaves can be connected through an overlay route through one or more intermediate enclaves. Status module 24 may then randomly select one of the available routes and provides this information to the Configurable Protocol Stack (CPS). Communication module 22 may then route IP packets destined for the previously unreachable enclave through these intermediate enclaves. Such overlay routing may be performed directly over the IP layer. If IP-in-IP encapsulation were to be used, 20 bytes of overhead would be added for each packet transmitted over an overlay route. Minimum encapsulation would reduce this overhead to 12 bytes per packet. Conversely, in accordance with the techniques of this disclosure, this per-packet overhead for overlay routing may be reduced to 4 bytes for routes through a single intermediary enclave and 8 bytes for routes with 2 to 4 intermediaries. Computing device 10 achieves this by utilizing a compact encoding of the source route calculated by status module 24 into the IP option header for each overlay routed data packet.

Figure 6:
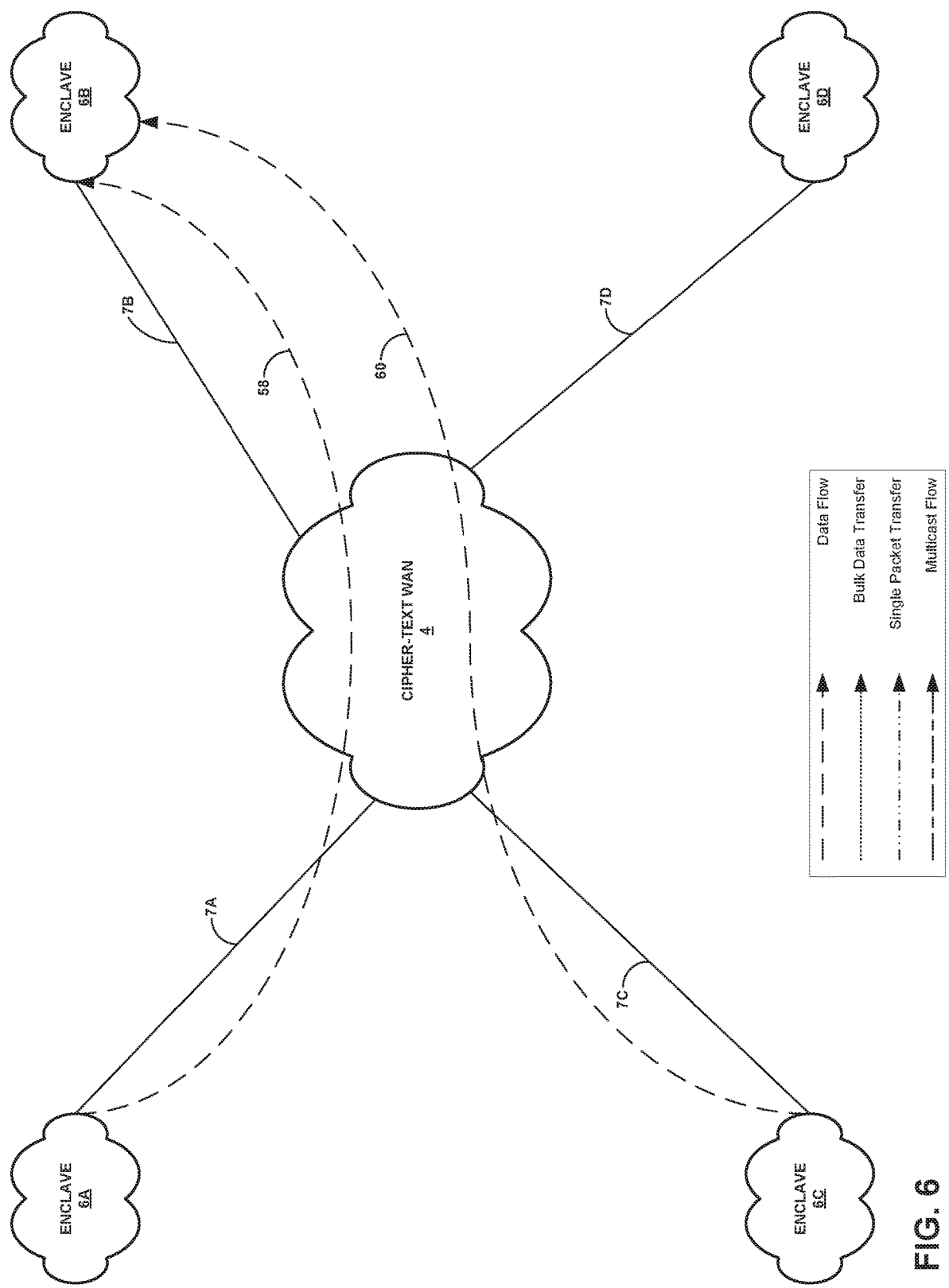
FIG. 6 is a block diagram illustrating a network where two video flows compete for a limited bandwidth in a single enclave, in accordance with one or more techniques of this disclosure.

FIG. 6 is a block diagram illustrating a network where two video flows 58 and 60 compete for a limited bandwidth in enclave 6B, in accordance with one or more techniques of this disclosure. FIG. 6 describes a case where multiple high priority flows (video flows 58 and 60) compete for a bottleneck link and bandwidth on the SATCOM downlink of enclave 6B. Assume that both video flows 58 and 60, one sourced from enclave 6A (video flow 58) and the other from enclave 6C (video flow 60), have the same priority (i.e., 99) and performance utility as that of the previous example. For this case, the maximum achievable Cumulative Network Performance ($CNP_0$) is 99 since only one of the two video may be accommodated on the 1 Mbps SATCOM link. Using techniques of this disclosure, the computing device in enclave 6B may admit one of the two flows while the second would be stopped at its source enclave, yielding an effective CNP of 99 and a normalized CNP of 100%.

In general, computing device 10 handles network congestion using a combination of congestion prevention for access links and congestion mitigation for links within cipher-text WAN 4. Referring to FIG. 6, the 1 Mbps access link of enclave 6B can only support one of the two 1 Mbps UDP video flows 58 and 60 arriving at enclave 6B from enclave 6A and enclave 6C, respectively. Since both of video flows 58 and 60 have equal priority, the computing device residing in enclave 6B may admit the first among them to arrive at enclave 6B using its explicit signaling mechanism for flow admission control; the second, later arriving video stream, will be rejected and will be throttled at its source enclave.

Suppose video flow 58 from enclave 6A to enclave 6B starts first. When the first packet in that stream arrives at the computing device on enclave 6B, the computing device may determine whether the SATCOM downlink has enough available bandwidth to accommodate video flow 58. In this case, since no other flows are competing for that downlink, video flow 58 will be admitted and will proceed normally. Suppose the video stream 60 from enclave 6C to enclave 6B starts. Upon arrival of the first packet of video flow 60 at enclave 6B, the computing device at enclave 6B may determine that the downlink is already being utilized by a 1

Mbps flow of equal priority as that of the newly arriving video flow 60. The computing device may therefore send a signaling message back to enclave 6C rejecting admission to video flow 60. The computing device at enclave 6C may then stop transmission of video flow 60 to enclave 6B for a preconfigured time before resuming it again to determine if enclave 6B will admit video flow 60. The computing device at enclave 6C may abort the flow after a configured number of such retries.

The flow rejection signal sent from enclave 6B to enclave 6C in this example could be embedded within existing traffic, e.g., the periodic tunnel state information signal sent by enclave 6B to enclave 6C. This will result in zero network overhead for this signaling message.

Figure 7:
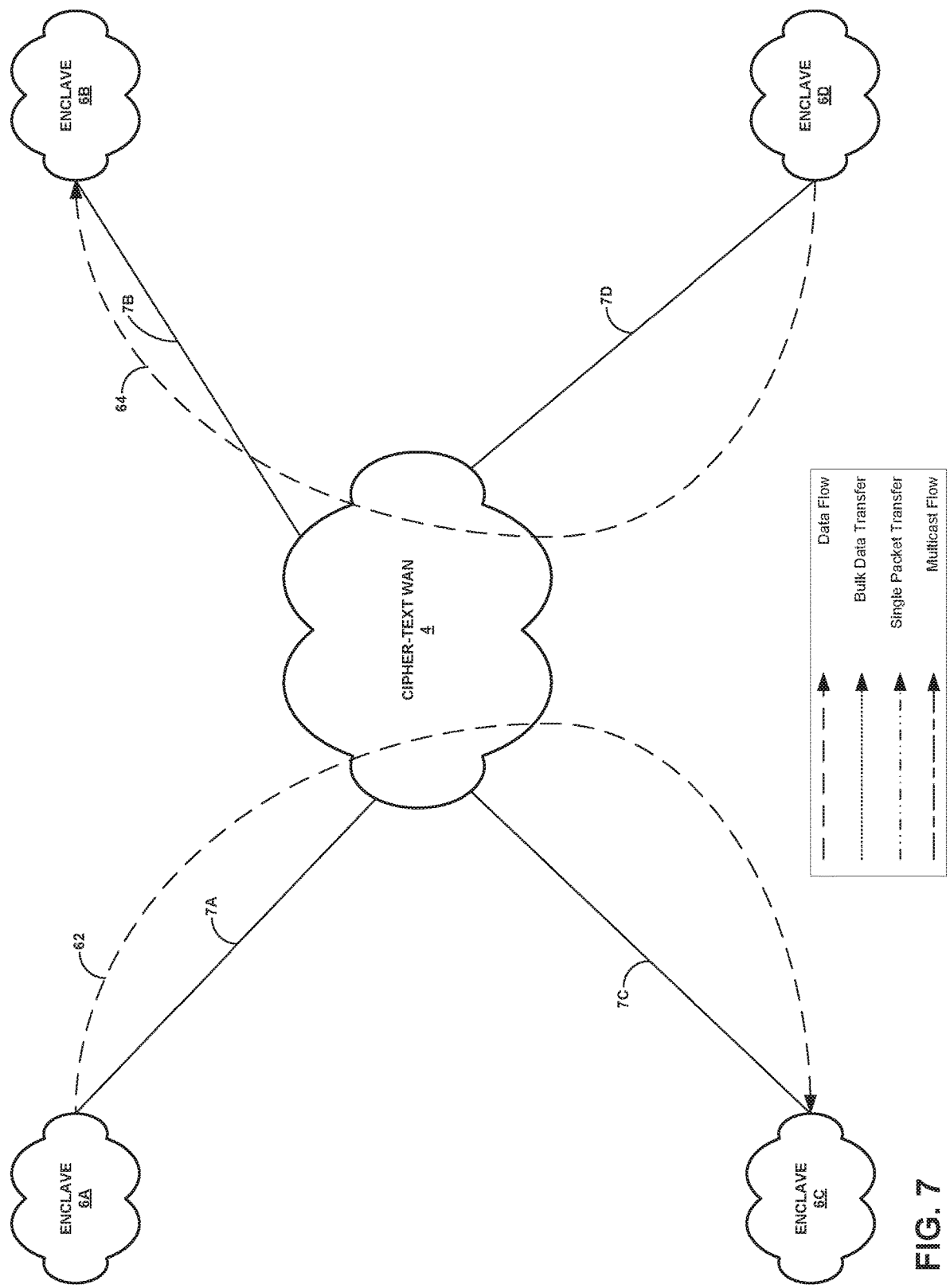
FIG. 7 is a block diagram illustrating a network where a video flow is sent over a unidirectional tunnel, in accordance with one or more techniques of this disclosure.

FIG. 7 is a block diagram illustrating a network where video flow 62 is sent over a unidirectional tunnel, in accordance with one or more techniques of this disclosure. In the example of FIG. 7. INEs fronting enclaves 6A-6D have each been configured, using pre-placed keys (PPKs), with IPsec tunnels providing point-to-point VPN connections between the INEs. Further, the mission may simultaneously require two high priority (say priority 99) UDP video streams: one sourced from enclave 6A to enclave 6C (flow 62) and another sourced from enclave 6D to enclave 6B (flow 64). Video flows 62 and 64 may have the same performance utility functions, i.e., a value of 0 for allocated network bandwidth of less than 1 Mbps and a value of 1 for bandwidth equal to or greater than 1 Mbps.

Due to accidental or malicious misconfiguration of routers in cipher-text WAN 4, the direct route between enclave 6A and enclave 6C may be unidirectional, i.e., packets can flow from enclave 6A to enclave 6C over the direct route on cipher-text WAN 4. However, there is no direct route over cipher-text WAN 4 for packets from enclave 6C to enclave 6A. Furthermore, the use of PPKs enables a unidirectional IPsec tunnel to operate between enclaves 6A and 6C. Assume further that this unidirectional tunnel has the capacity needed to support the video flow from enclave 6A to enclave 6C. In the presence of this network event, the network is capable of transporting both video streams simultaneously yielding the maximum achievable network performance of 99+99=198.

Figure 8:
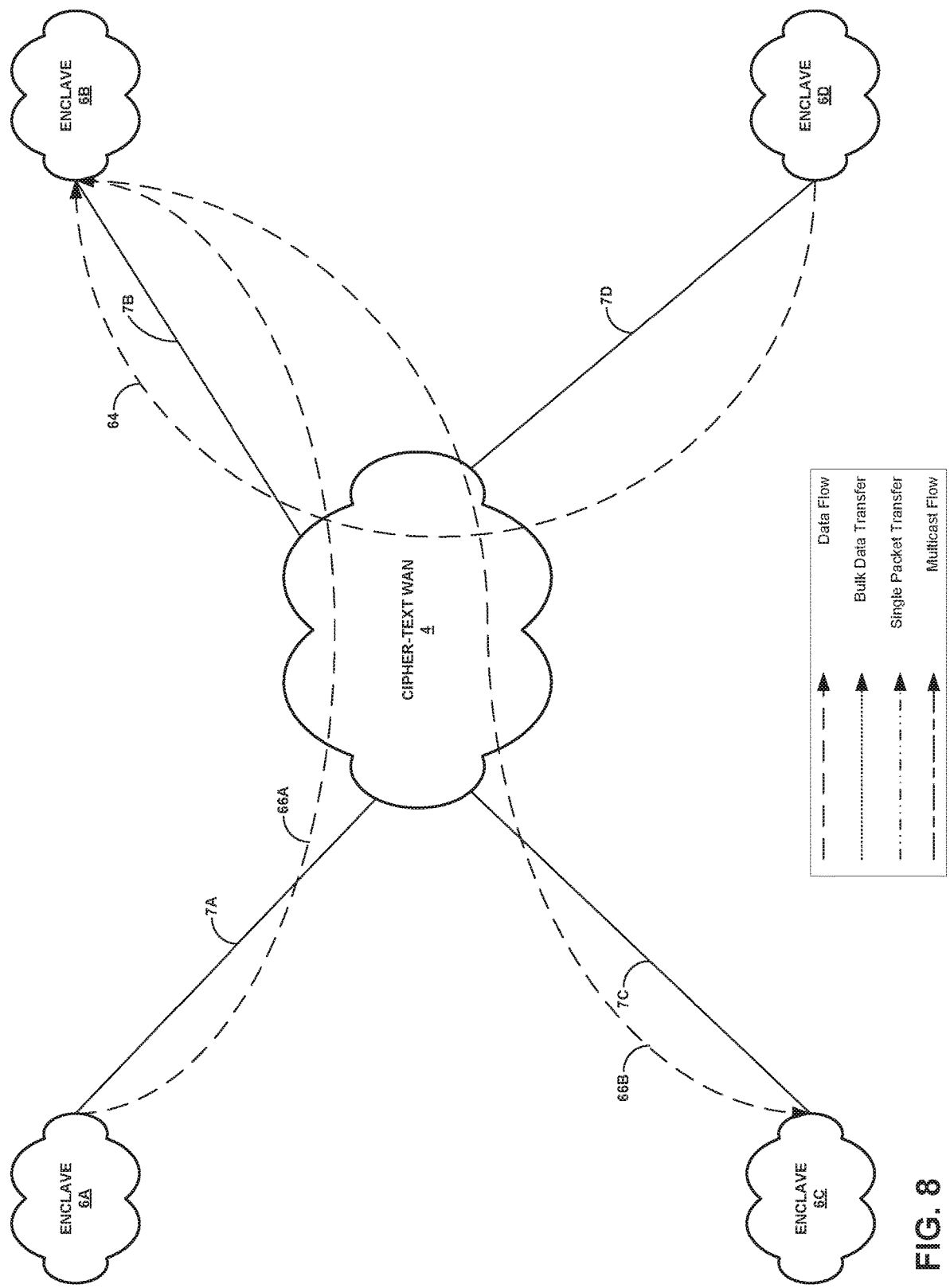
FIG. 8 is a block diagram illustrating a network with multiple unidirectional Internet Protocol Security (IPSec) tunnels, in accordance with one or more techniques of this disclosure.

FIG. 8 is a block diagram illustrating a network with multiple unidirectional Internet Protocol Security (IPsec) tunnels 64 and 66 as a continuation of FIG. 7, in accordance with one or more techniques of this disclosure. According to previous techniques. TCP-based "pseudo traffic" probes used to sense the quality of the direct path between enclave 6A and enclave 6C and the indirect red-to-red path through enclave 6B (as shown in FIG. 8) would conclude, albeit mistakenly, that there is no direct path between the enclaves 6A and 6C (since TCP ACKs do not get back over the direct path). The previous techniques would produce a conclusion that the only path between enclaves 6A and 7C is through an intermediary in enclave 6B. Consequently, video flow 62 (of FIG. 7) from enclave 6A to enclave 6C would unnecessarily be diverted through enclave 6B where flow 66 will compete with video flow 64 from enclave 6D to enclave 6B for the 1 Mbps SATCOM downlink, as shown in FIG. 8. Since both flows 64 and 66 have the same priority, flows 64 and 66 will be apportioned an equal share of the 1 Mbps link, resulting in both flows 64 and 66 having their utilities reduced to 0. The result is a normalized CNP of 0% for this mission scenario.

Conversely, in accordance with techniques of this disclosure, computing device 10 may employ a lightweight protocol which enables each computing device to share a subset of the tunnel state information (i.e., up/down status of each IPsec tunnel) with other computing devices. The computing devices may merge this information independently to arrive at a view of the state of all the tunnels and the tunnel-oriented adjacencies between the enclaves. Each computing device is able then to derive available tunnel-based paths (i.e., a sequence of red-to-red hops) between the respective computing device and a destination enclave, even if a path traverses a unidirectional tunnel. Proactive path discovery, combined with mission-aware admission control, enables computing device 10 to support video flow 62 from enclave 6A to enclave 6C over the direct WAN path between enclaves 6A and 6C while simultaneously supporting video flow 64 from enclave 6D to enclave 6B. The result is a CNP of 99+99=198 or a normalized CNP of 100% for the scenario of FIG. 7.

Figure 9:
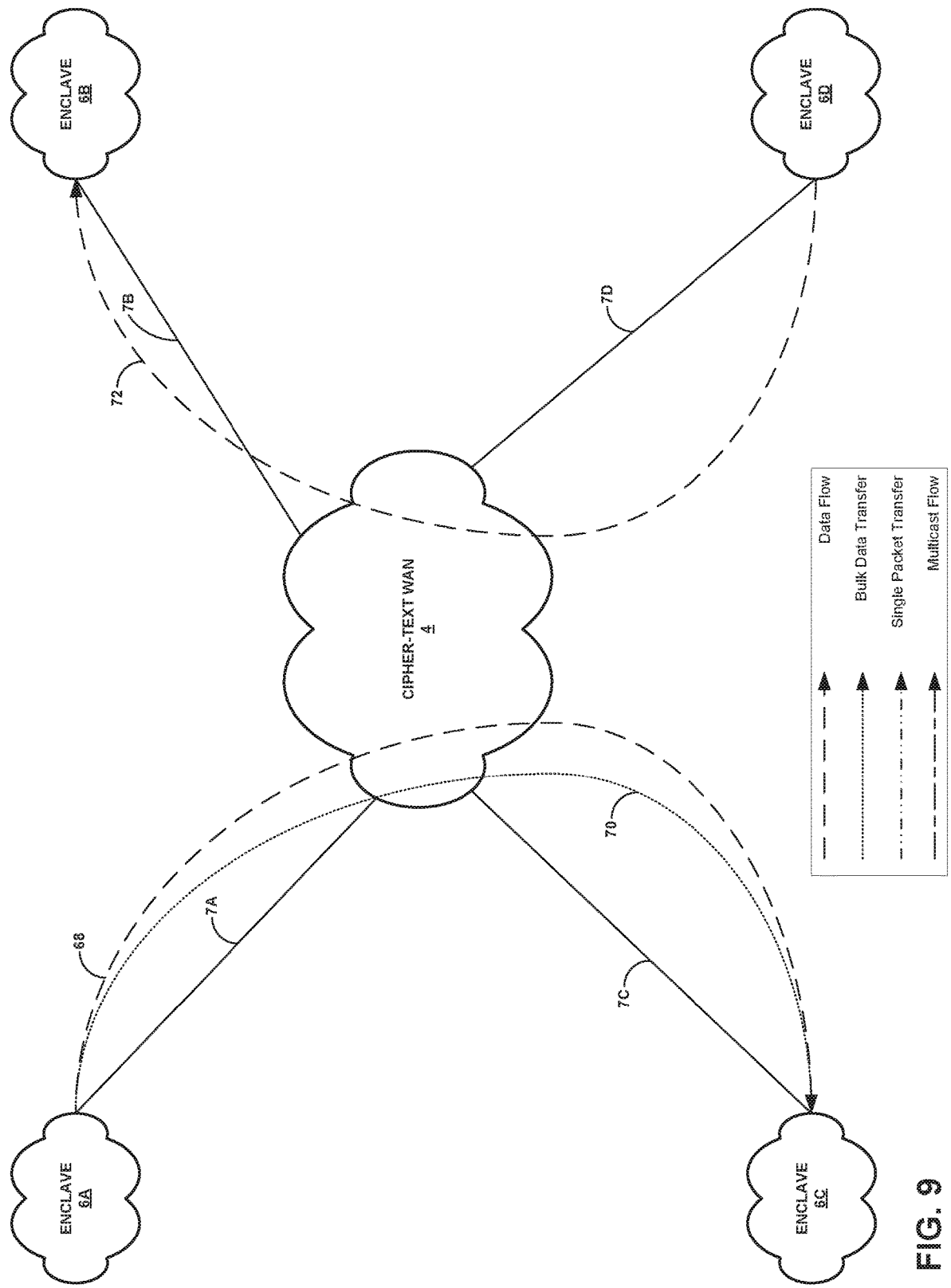
FIG. 9 is a block diagram illustrating a network recovering from network events affecting a single data flow, in accordance with one or more techniques of this disclosure.

FIG. 9 is a block diagram illustrating a network recovering from network events affecting single data flow 68, in accordance with one or more techniques of this disclosure. FIG. 9 presents a refinement of FIG. 7 to showcase another technical challenge addressed by the techniques of this disclosure, i.e., recovery from network events affecting an individual flow among a set of flows between two enclaves. The scenario of FIG. 9 adds another flow 70, i.e., a TCP-based bulk data transfer, e.g., data back-up, from enclave 6A to enclave 6C in addition to UDP video stream (i.e., video flow 68) flowing between enclaves 6A and 6C in the same direction. Again, assume that the IPsec tunnel from enclave 6A to enclave 6C is unidirectional, as in FIG. 7. Suppose the priority of the bulk data transfer 70 is 1, the priority of video flow 68 sourced by enclave 6A is 100, and the priority of video flow 72 sourced by enclave 6D is 99. The performance utility of bulk data transfer 70 may be 0 for supported network data rates of less than 500 Kbps, 0.9 for data rates between 500 kbps and 1 Mbps and 1 for data rates above 1 Mbps. The performance utility of video flows 68 and 72 may be 0 if the supported data rate is less than 1 Mbps or if the average inter-enclave transfer latency of packets over a 10 second interval is greater than 2 seconds. The performance utility of video flows 68 and 72 may be 1 if cipher-text WAN 4 can provide a bandwidth of at least 1 Mbps and if the network can ensure average packet latency of 2 seconds or less. It can be assumed that the one-way latency over the SATCOM links is less than 1 second.

A network event may occur in cipher-text WAN 4 which results in video flow 68 and bulk data transfer flow 70 on the unidirectional tunnel between enclaves 6A and 6C being delayed by more than 2 seconds, thereby affecting the performance utility of video flow 68 but not that of bulk data transfer flow 70 between enclaves 6A and 6C.

Figure 10:
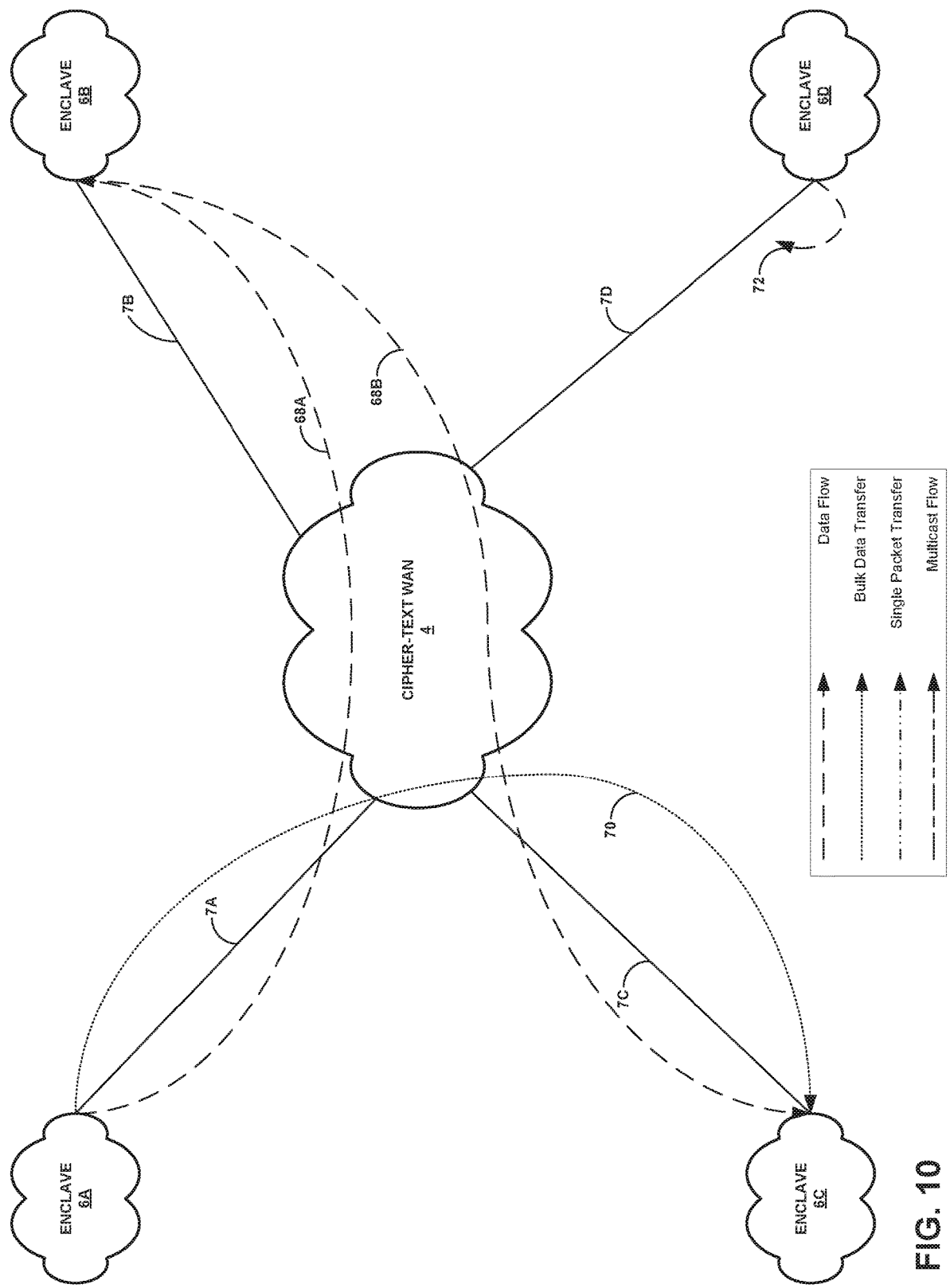
FIG. 10 is a block diagram illustrating a network where an individual data flow recovers from a network event, in accordance with one or more techniques of this disclosure.

FIG. 10 is a block diagram illustrating a network where video flow 68 recovers from a network event, in accordance with one or more techniques of this disclosure. Using a zero overhead packet time stamping mechanism in combination with its light weight signaling protocol, techniques of this disclosure may selectively divert video flow 68 originating from enclave 6A through enclave 6B for delivery to enclave 6C (i.e., video flows 68A and 68B). Since video flow 68 has a higher priority than video flow 72 from enclave 6D, which is competing for the 1 Mbps SATCOM link at enclave 6B, computing device 10's mission-aware admission control mechanism may squelch the lower priority video flow 72 at enclave 6D, enabling the higher priority video flow 68 to get the full 1 Mbps data rate needed. The TCP-based bulk data transfer flow 70 from enclave 6A to enclave 6C may proceed over the direct route between enclaves 6A and 6C at a data rate well above 1 Mbps, yielding a CNP of 100+1=101 which is the maximum achievable. Thus, techniques of this disclosure may be able to achieve a normalized CNP of 100%.

Using the same performance utility functions, a network event may occur that causes the bottleneck WAN link between enclaves 6A and 6C to encounter congestion causing both flows 68 and 70 to fall below the 1 Mbps data rate at which computing device 10 at enclave 6A is transmitting these flows. The congestion may result in unacceptable packet losses for both flows 68 and 70, which will be detected by the computing device at enclave 6C. The computing device at enclave 6C may respond to this detected congestion by sending a signal immediately to computing device 10 at enclave 6A to throttle the rate of bulk data transfer flow 70 to 0 Kbps. Video flow 68 may be maintained at 1 Mbps. If these alterations do not relieve the congestion for video flow 68, the computing device at enclave 6C may signal computing device 10 at enclave 6A to reroute both flows over an overlay path between enclaves 6A and 6C. If congestion still persists after multiple retries over different paths, and if all other flows reaching the enclave also suffer congestion, the computing device at enclave 6C may infer that the access link connecting enclave 6C to cipher-text WAN 4 is being flooded with attack traffic which interferes with legitimate traffic directed at enclave 6C.

Conversely, if the throttling of bulk data transfer flow 70 at enclave 6A relieves congestion for video flow 68, the computing device at enclave 6C may signal computing device 10 at enclave 6A to reroute only bulk data transfer flow 70 over an overlay path between enclaves 6A and 6C if one is available. Again, the computing device may embed the signaling messages sent from enclave 6C to enclave 6A in this example within data packets headed towards that enclave to yield zero network overhead.

The mechanism used by computing devices (e.g., computing device 10) to recover from packet delay attacks impacting any selected application flow between enclaves is similar to that of the congestion mitigation case described above. Referring to FIG. 9, suppose video flow 68 from enclave 6A to enclave 6C is the victim of a packet delay attack. The computing device at enclave 6C may detect this attack, which will signal computing device 10 at enclave 6A to reroute the attacked video flow 68 over an indirect path between the enclaves, if one is available.

Figure 11:
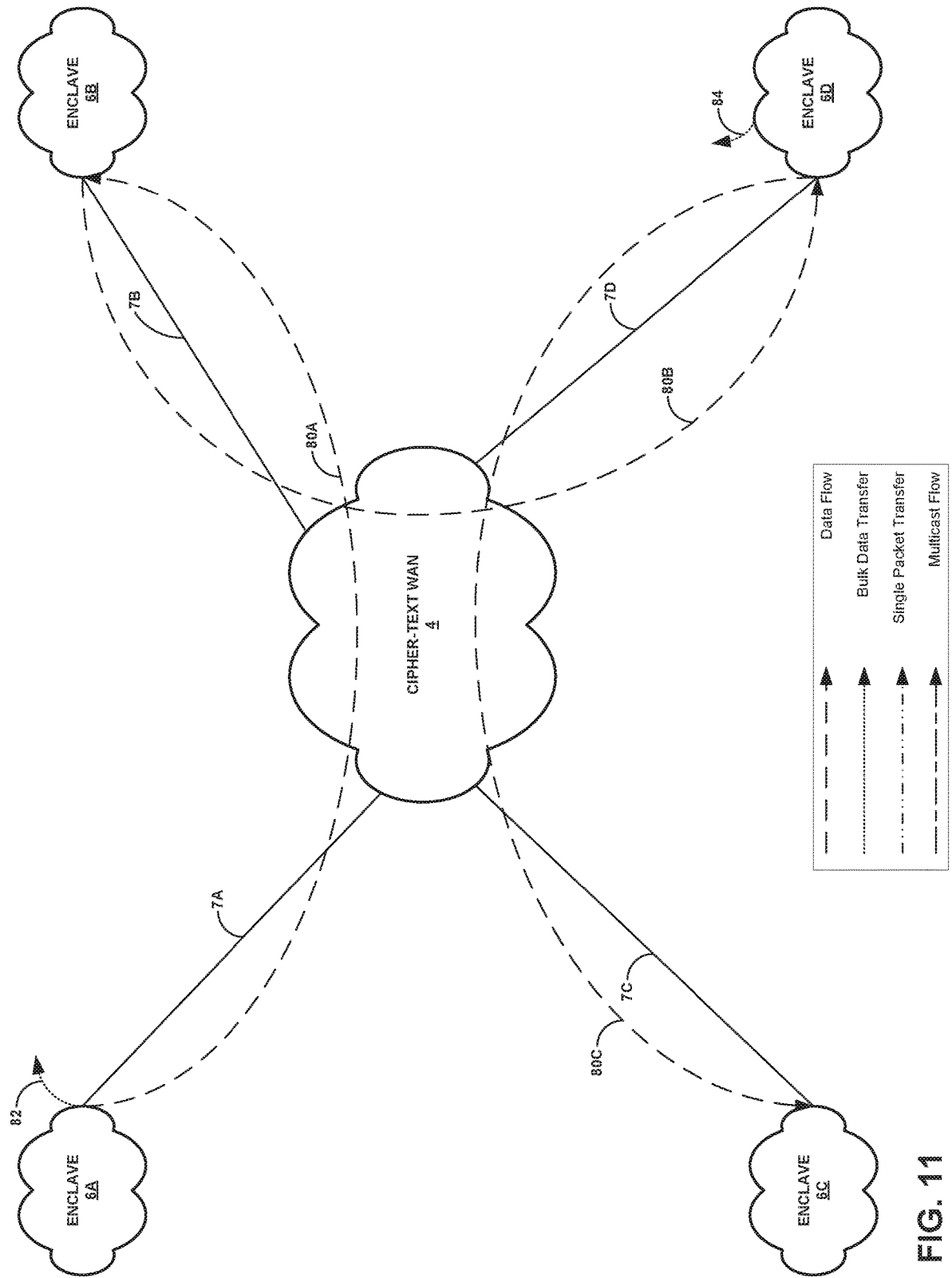
FIG. 11 is a block diagram illustrating a network with overlaid routing through multiple intermediate enclaves, in accordance with one or more techniques of this disclosure.

FIG. 11 is a block diagram illustrating a network with overlaid routing through multiple intermediate enclaves 6B and 6D, in accordance with one or more techniques of this disclosure. In FIG. 11, a network event may eliminate all direct routes over cipher-text WAN 4 between enclave 6A and enclave 6C. Also, the only indirect, red-to-red, route available for communication between enclaves 6A and 6C may be a multi-hop route through enclaves 6B and 6D, as shown in FIG. 11. The challenge in this example is to discover this indirect route and restore connection for flow 80 between enclaves 6A and 6C within the 10 second recovery goal and to accomplish this restoration without violating the 10 Kbps network overhead budget. By exchanging tunnel state information, the techniques described herein may accomplish this goal.

Figure 12:
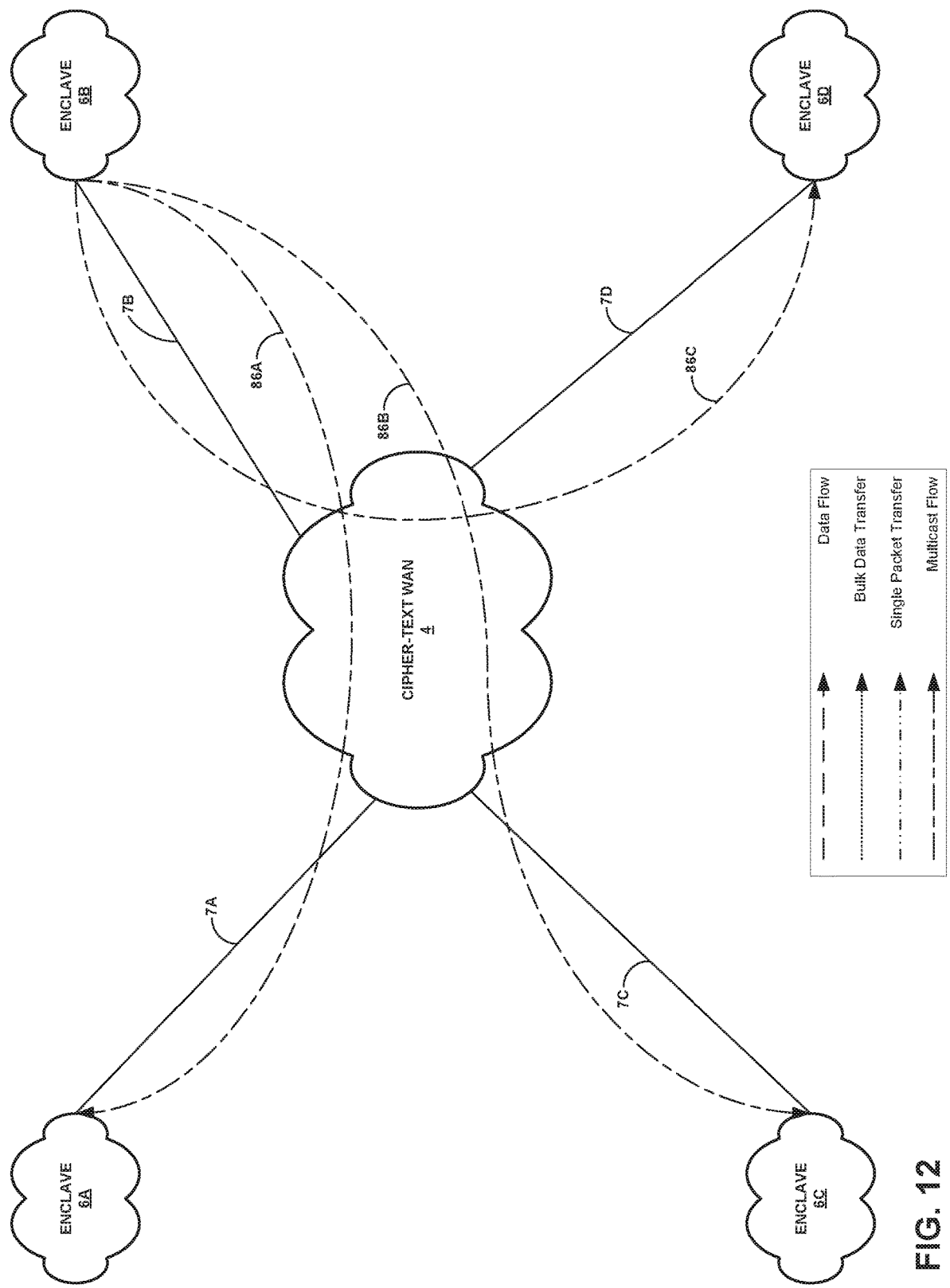
FIG. 12 is a block diagram illustrating a network handling the distribution of multicast flows, in accordance with one or more techniques of this disclosure.

FIG. 12 is a block diagram illustrating a network handling the distribution of multicast stream 86, in accordance with one or more techniques of this disclosure. In the example of FIG. 12, an application in enclave 6B may transmitting a UDP-based 1 Mbps multicast video stream 86 being subscribed by applications in enclaves 6A, 6C, and 6D that have a priority value of 10, 40, and 50 respectively for this video (i.e., the different subscribers have different mission priorities for this video). A CSfC-based INE (i.e., layered VPN) may be used by enclaves 6A 6C, and 6D. Since CSfC INEs may not have support for multicast VPNs and may only support unicast VPNs, multicast stream 86 for this scenario may be distributed over three different unicast tunnels from enclave 6B, one to each of enclaves 6A, 6C, and 6D. However, since the SATCOM uplink connecting enclave 6B to cipher-text WAN may only have the capacity to support the tunnel carrying the 1 Mbps video, this approach may result in congestion at that link, degrading all three unicast flows or supporting only the highest priority flow to enclave 6C. The latter may yield a CNP of 50. Using a multicast service reflection technique, described below, the computing device at enclave 6B may ensure delivery of multicast stream 86 to all of the receivers in this scenario, yielding a CNP of 100.

The computing device at enclave 6B may implement a multicast service reflection scheme to address this problem, where the multicast packets from enclave 6B are sent to a computing device behind a 100 Mbps access link, such as the computing device in enclave 6D. This computing device may then serve as a proxy for the original sender of multicast stream 86 and reflect the multicast stream out to overlay tunnels from enclave 6D to all the other destination enclaves containing subscribers, i.e., enclaves 6A and 6C.

In other instances, suppose there is congestion on the path between enclave 6D and enclave 6C which results in excessive packet losses for multicast stream 86B received by enclave 6C. In this case, the computing device at enclave 6C may leave the multicast group immediately upon sensing the congestion unless there is a lower priority flow being received at enclave 6C. In the latter case, the computing device at enclave 6C may first throttle the lower priority flow to relieve congestion for multicast flow 86C before leaving the multicast group.

For INEs that support multicast natively, e.g., HAIPEs, the computing device at the respective enclave may respond to the failure of a subscriber in its enclave to receive a multicast stream by signaling the appliance at the source enclave to instead forward the multicast from the source to the victim enclave over the unicast IPsec tunnel between these enclaves. Since this change of transmission might overload and congest the SATCOM link for sources behind such links, the multicast stream may be reflected through a capable enclave behind a 100 Mbps access link.

If these multicast INEs support multicast VPNs using pre-placed keys (e.g., ViaSat KG-250X), multicast routing on the cipher-text WAN 4 side may be based on PIM-SM. In such instances, misconfiguration of the PIM rendezvous point (RP) on some of the routers in cipher-text WAN 4 may prevent the multicast flow from reaching enclave 6D. The challenge of this example is to detect the impairment to a portion of the cipher-text WAN 4-side multicast distribution tree for this application from enclaves 6 without having direct visibility into cipher-text WAN 4 and to accomplish this within the 10 Kbps network overhead budget. The techniques described herein overcome this challenge using the lightweight state sharing protocol which enables the appliance at enclave 6D to detect disconnection from the multicast tree and initiate actions to recover from the disconnection. The result is a CNP of 100.

The techniques described herein may also provide mission-aware multicast congestion control. For the example of FIG. 12, due to some network event such as a cyber-attack or misconfiguration, the portion of the cipher-text WAN 4 multicast distribution tree delivering video flow 86C to enclave 6D is congested by competing traffic (or attack traffic). Consequently, multicast stream 86C received by the high priority application in enclave 6D may experience unacceptable packet losses (i.e., greater than 10% loss), thereby reducing the performance utility of multicast stream 86 for this application to 0. The techniques described herein may detect the onset of such multicast flow impairments without imposing any network overhead and mechanisms to recover the flow to restore its maximum CNP. Furthermore, the techniques described herein may also protect multicast flows from packet flooding attacks targeting the entire multicast group, including some attacks on INEs. The techniques described herein may also protect packet delay attacks targeting all or part of the multicast distribution tree of a multicast VPN on cipher-text WAN 4.

Low volume packet flooding attacks, such as a 1 Mbps packet flood directed at an enclave behind a 1 Mbps SATCOM link, e.g., enclave 6B, could easily go undetected. However, such attacks may have a devastating impact on mission applications within that enclave since the packet flows received by these applications may not have sufficient bandwidth. In accordance with techniques of this disclosure for handling such network events, the entire functionality for detection of these events may be implemented on a computing device within the PT side of an enclave without requiring any explicit signaling between this computing device and cipher-text WAN 4.

Finally, the techniques described herein may provide a capability for supporting packet flows over cipher-text WAN 4 which may have a deadline-based performance utility function. For such flows, the network performance of the flow becomes zero if the packets in the flow are not delivered from the source enclave to the destination enclave within a specified latency or deadline. A computing device implementing the techniques of this disclosure may achieve this by sending multiple copies of each packet from the source enclave to the destination enclave where each copy of a packet is sent over a different red-to-red route between the enclaves. Computing device 10 may accomplish this using its ability to discover paths with hop counts greater than two and its ability to support UDP flows natively (i.e., without encapsulation within TCP).

Figure 13:
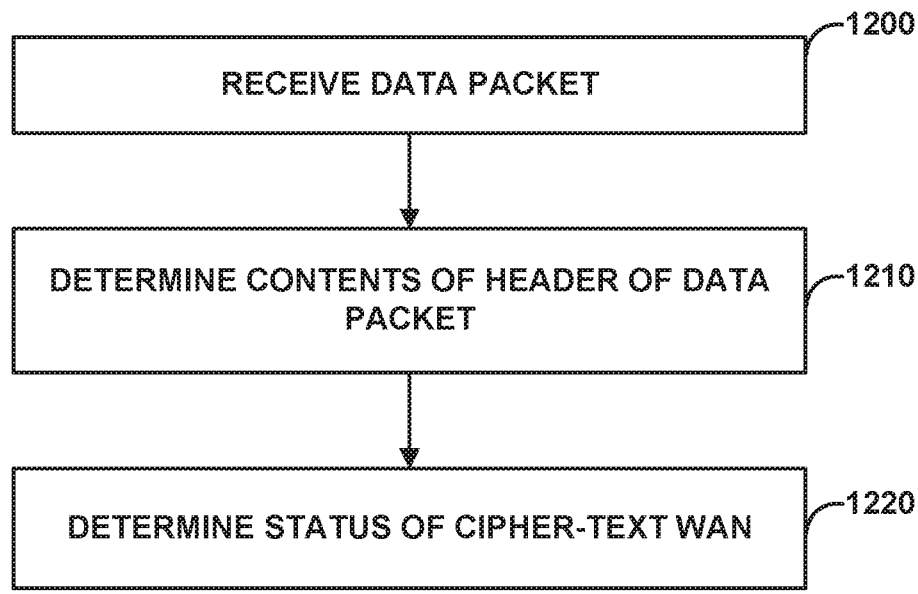
FIG. 13 is a flow diagram illustrating techniques for monitoring a status of a cipher-text WAN, in accordance with one or more techniques of this disclosure.

FIG. 13 is a flow diagram illustrating techniques for monitoring a status of a cipher-text WAN, in accordance with one or more techniques of this disclosure. The operations of computing device 10 are described within the context of system 2 of FIG. 1 and computing device 10 of FIG. 2.

In accordance with techniques of this disclosure, communication module 22 of computing device 10 may receive, via communication units 44, a data packet from a second computing device in a plain-text portion of a second enclave behind an INE via the connected cipher-text WAN (1200). For instance, a host device in a second enclave may send a multicast flow that includes a client device in the same enclave as computing device 10 via the second computing device and the connected cipher-text WAN. Computing device 10, acting as a transparent bridge for all incoming and outgoing IP traffic, may receive the multicast flow of data packets as it is transmitted to the client device.

Contents module 20 of computing device 10 may determine contents of a header of the data packet (1210). The contents of the header of the data packet may include any one or combination of a timestamp for the data packet, a connection state for the flow's host enclave, a priority of the associated flow, or any other information descriptive of either the flow's host device, the flow's host enclave, or the flow itself. For instance, in some examples, the host device from which the flow originates may populate the header of the data packet with the descriptive information. In other instances, the second computing device fronting the flow's host enclave may instead populate the header of the data packet.

Status module 24 of computing device 10 may determine a status of the connected cipher-text WAN based at least in part on the contents of the header of the data packet (1220). In other words, based on the descriptive information inserted into the headers by either the host device or the second computing device in the flow's host enclave, computing device 10 may be capable of detecting a status or an occurrence of a network event within cipher-text WAN 4.

Figure 14:
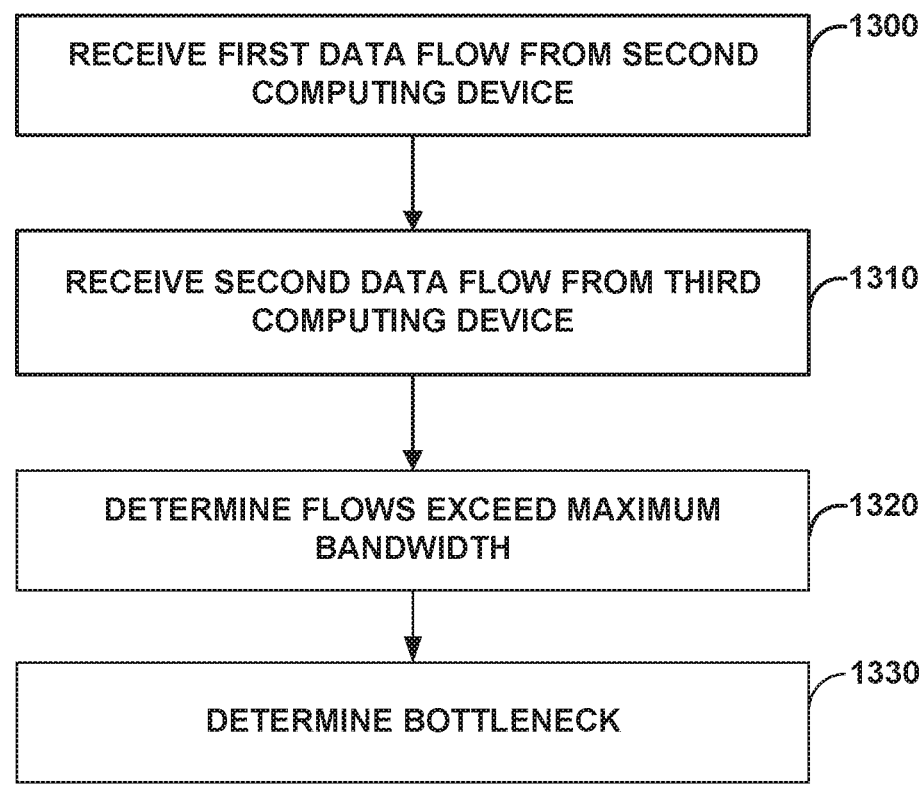
FIG. 14 is a flow diagram illustrating techniques for determining a bottleneck within a cipher-text WAN, in accordance with one or more techniques of this disclosure.

FIG. 14 is a flow diagram illustrating techniques for determining a bottleneck within a cipher-text WAN, in accordance with one or more techniques of this disclosure. The operations of computing device 10 are described within the context of system 2 of FIG. 1 and computing device 10 of FIG. 2.

For instance, communication module 22 may receive a first data flow from the second computing device (1300). Communication module 22 may further receive a second data flow from a third computing device in a plain-text portion of a third enclave via cipher-text WAN 4, where the second data flow includes a second data packet from the third computing device via cipher-text WAN 4 (1310). The second data packet may include a header, the contents of which contain a second timestamp. Status module 24 may determine that a combined bandwidth of the two data flows exceeds a maximum bandwidth for the first enclave (1330). Responsive to determining that a first bandwidth of the first data flow combined with a second bandwidth of the second data flow exceeds a maximum bandwidth for the first enclave, status module 10 may determine, based at least in part on the first timestamp, that the status of cipher-text WAN 4 is a bottleneck at the first enclave (1340).

In such instances, responsive to determining that the status of cipher-text WAN 4 is the bottleneck, contents module 20 may determine a first priority of the first data flow and a second priority of the second data flow. Contents module 20 may then compare the first priority and the second priority. Responsive to contents module 20 determining that the first priority is greater than the second priority, communication module 22 may squelch the second data flow from the third computing device. Conversely, responsive to contents module 20 determining that the second priority is greater than the first priority, communication module 22 may squelch the first data flow from the second computing device. However, responsive to contents module 20 determining that the first priority is equal to the second priority, contents module 20 may further determine a first time indicated by the first timestamp and a second time indicated by the second timestamp located in the contents of the header of the second data packet. Contents module 20 may then compare the first time and the second time. Responsive to contents module 20 determining that the first time is earlier than the second time, communication module 22 may squelch the second data flow from the third computing device. Conversely, responsive to contents module 20 determining that the second time is earlier than the first time, communication module 22 may squelch the first data flow from the second computing device. For the purposes of this disclosure, squelching a data flow includes sending a data packet to the host computing device of the data flow, where the data packet includes an indication for the host computing device to cease sending the data flow to the receiving computing device (e.g., computing device 10).

Responsive to computing device 10 determining that there is enough bandwidth to receive the squelched data flow, communication module 22 may send another data packet to the host computing device that includes an indication for the second computing device to resume sending the squelched data flow to computing device 10.

Figure 15:
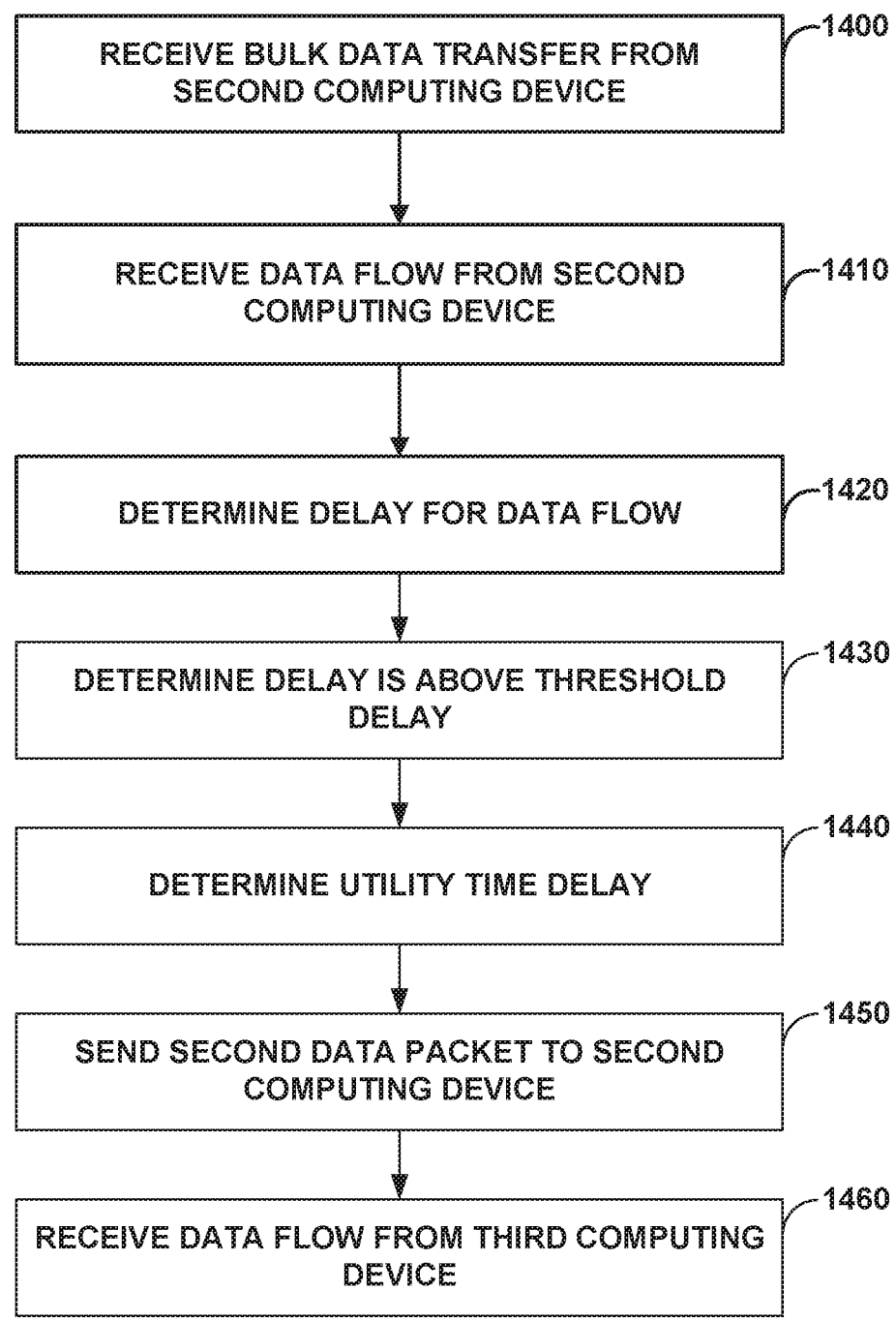
FIG. 15 is a flow diagram illustrating techniques for determining a performance time delay within a cipher-text WAN, in accordance with one or more techniques of this disclosure.

FIG. 15 is a flow diagram illustrating techniques for determining a performance latency within a cipher-text WAN, in accordance with one or more techniques of this disclosure. The operations of computing device 10 are described within the context of system 2 of FIG. 1 and computing device 10 of FIG. 2.

In such instances, communication module 22 may receive a bulk data transfer from the second computing device (1400). Communication module 22 may also receive a data flow from the second computing device (1410). In this instance, the first data packet is associated with the data flow. Contents module 20 may then determine, based at least in part on the timestamp of the data packet, a delay for the data flow by finding the difference between the timestamp of the data packet and a current time (1420). Responsive to contents module 20 determining that the delay for the data flow is above a threshold delay (1430), status module 24 may determine that the status of the cipher-text WAN is a performance latency (1440). Communication module 22 may then send a second data packet to the second computing device that includes an indication for the second computing device to re-route the data flow through a third computing device in a plain-text portion of a third enclave (1450). Communication module 22 may then receive the data flow from the third computing device (1460).

Figure 16:
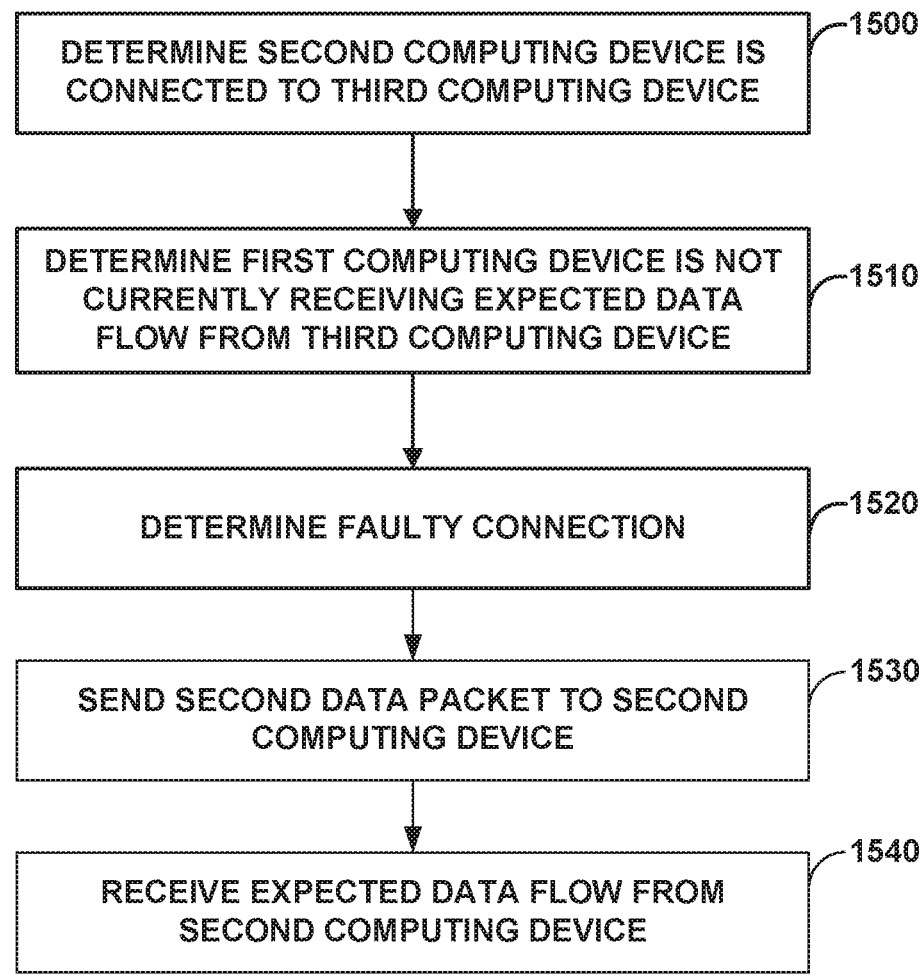
FIG. 16 is a flow diagram illustrating techniques for determining a faulty connection within a cipher-text WAN, in accordance with one or more techniques of this disclosure.

FIG. 16 is a flow diagram illustrating for determining a faulty connection within a cipher-text WAN, techniques for in accordance with one or more techniques of this disclosure. The operations of computing device 10 are described within the context of system 2 of FIG. 1 and computing device 10 of FIG. 2.

In such instances, contents module 20 may determine, based at least in part on a connection state in the data packet received from the second computing device, that the second computing device is connected to a third computing device in a plain-text portion of a third enclave (1500). Contents module 20 may then determine that the first computing device is not currently receiving an expected data flow from the third computing device (1510). As a result, status module 24 may determine that the status of cipher-text WAN 4 is a faulty connection between first enclave 6A and the third enclave (1520). To correct this status, communication module 22 may send a second data packet to the second computing device that includes an indication for the second computing device to receive the expected data flow from the third computing device and to send the expected data flow to computing device 10 (1530). Communication module 22 may then receive the expected data flow from the second computing device (1540).

Figure 17:
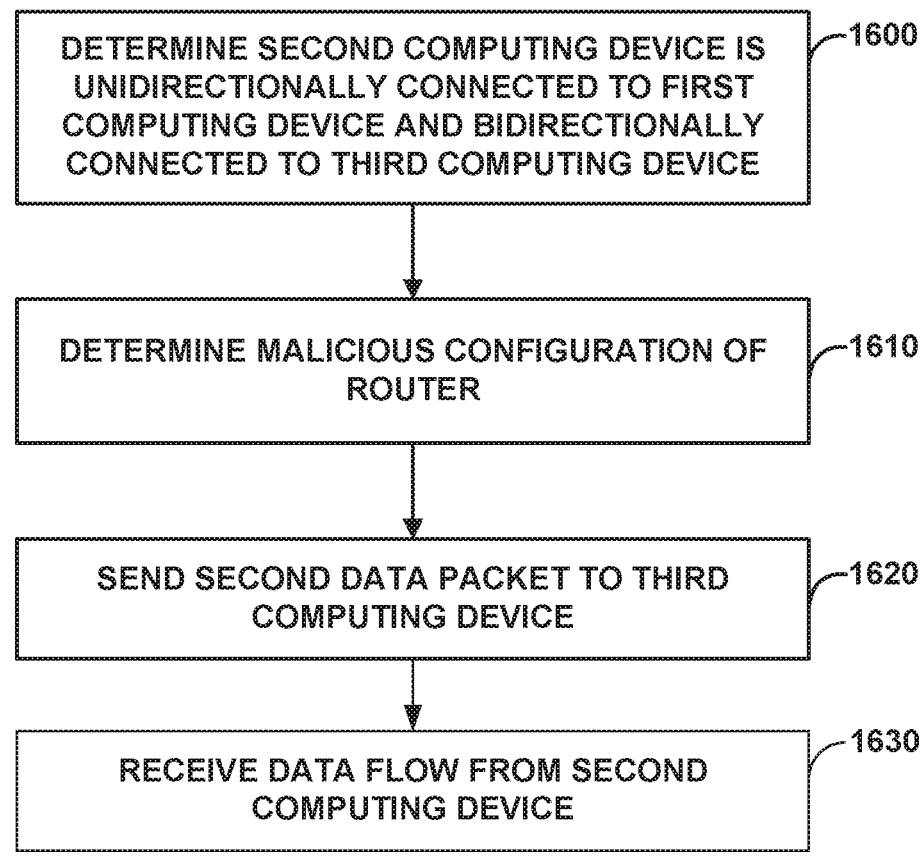
FIG. 17 is a flow diagram illustrating techniques for determining a malicious configuration of a router within a cipher-text WAN, in accordance with one or more techniques of this disclosure.

FIG. 17 is a flow diagram illustrating techniques for determining a malicious configuration of a router within a cipher-text WAN, in accordance with one or more techniques of this disclosure. The operations of computing device 10 are described within the context of system 2 of FIG. 1 and computing device 10 of FIG. 2.

In such instances, contents module 20 may determine, based at least in part on a connection state in the data packet received from the second computing device, that the second computing device is unidirectionally connected to the first computing device (i.e., the second computing device can send data to the first computing device but cannot receive data from the first computing device) and that the second computing device is bidirectionally connected to a third computing device in a plain-text portion of a third enclave (i.e., the second computing device can both send and receive data to and from the third computing device) (1600). Status module 24 may determine that the status of cipher-text WAN 4 is a malicious configuration of one or more routers in cipher-text WAN 4 (1610). To correct this status, communication module 22 may send a second data packet to the third computing device that includes an indication for the second computing device to send a data flow to computing device 10 (1620), as computing device 10 cannot directly send the data packet to the second computing device. Communication module 22 may then receive the data flow from the second computing device (1630).

Figure 18:
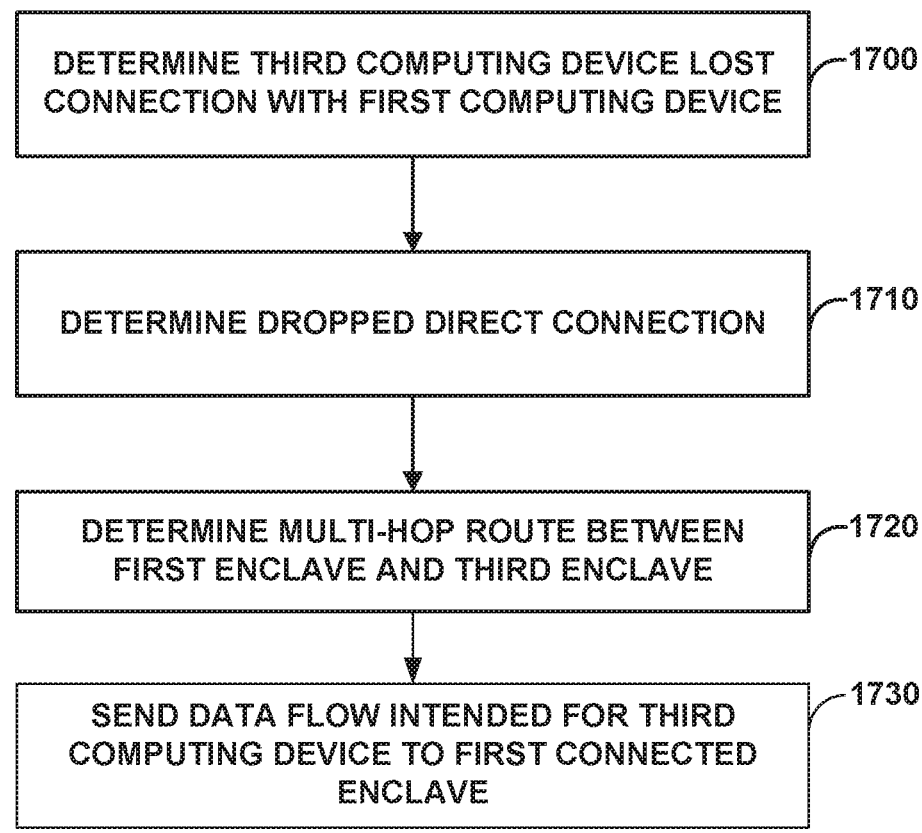
FIG. 18 is a flow diagram illustrating techniques for determining a dropped direct connection between two enclaves within a cipher-text WAN, in accordance with one or more techniques of this disclosure.

FIG. 18 is a flow diagram illustrating techniques for determining a dropped direct connection between two enclaves within a cipher-text WAN, in accordance with one or more techniques of this disclosure. The operations of computing device 10 are described within the context of system 2 of FIG. 1 and computing device 10 of FIG. 2.

In such instances, contents module 20 may determine, based at least in part on a connection state in the data packet received from the second computing device, that a third computing device in a plain-text portion of a third enclave has lost connection with computing device 10 (1700). Status module 24 may then determine that the status of cipher-text WAN 4 is a dropped direct connection between first enclave 6A and the third enclave (1710). To correct this status, contents module 20 may then determine, based at least in part on the connection state in the data packet received from the second computing device, a multi-hop route between first enclave 6A and the third enclave (1720). The multi-hop route may include a sequence of one or more connected enclaves that connect first enclave 6A to the third enclave. Communication module 22 may then send a data flow intended for the third computing device to a first connected enclave of the sequence of one or more connected enclaves (1730).

Figure 19:
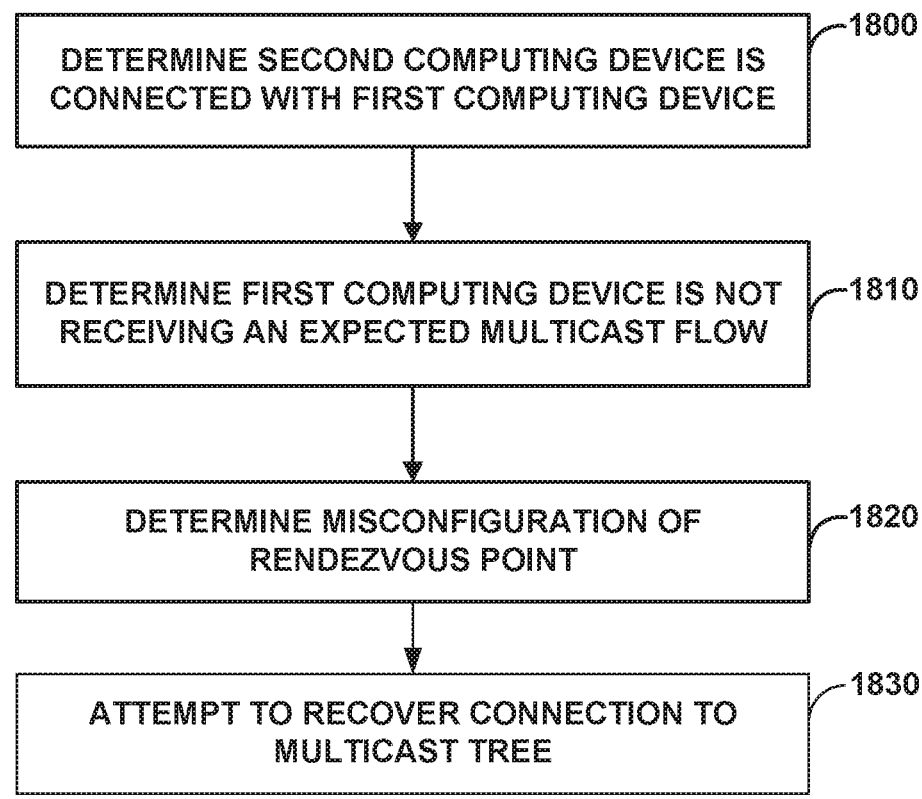
FIG. 19 is a flow diagram illustrating techniques for determining a misconfiguration of a rendezvous point within a cipher-text WAN, in accordance with one or more techniques of this disclosure.

FIG. 19 is a flow diagram illustrating techniques for determining a misconfiguration of a rendezvous point within a cipher-text WAN, in accordance with one or more techniques of this disclosure. The operations of computing device 10 are described within the context of system 2 of FIG. 1 and computing device 10 of FIG. 2.

In such instances, content module 20 may determine, based at least in part on a connection state in the data packet received from the second computing device, that the second computing device is connected to computing device 10 (1800). Communication module 22 may also determine that the computing device 10 is not currently receiving an expected multicast flow from the second computing device (1810). As such, status module 24 may determine that the status of cipher-text WAN 4 is a misconfiguration of a rendezvous point within cipher-text WAN 4 (1820). To correct this status, communication module 22 may attempt to recover a connection to a multicast tree for the second computing device (1830).

Figure 20:
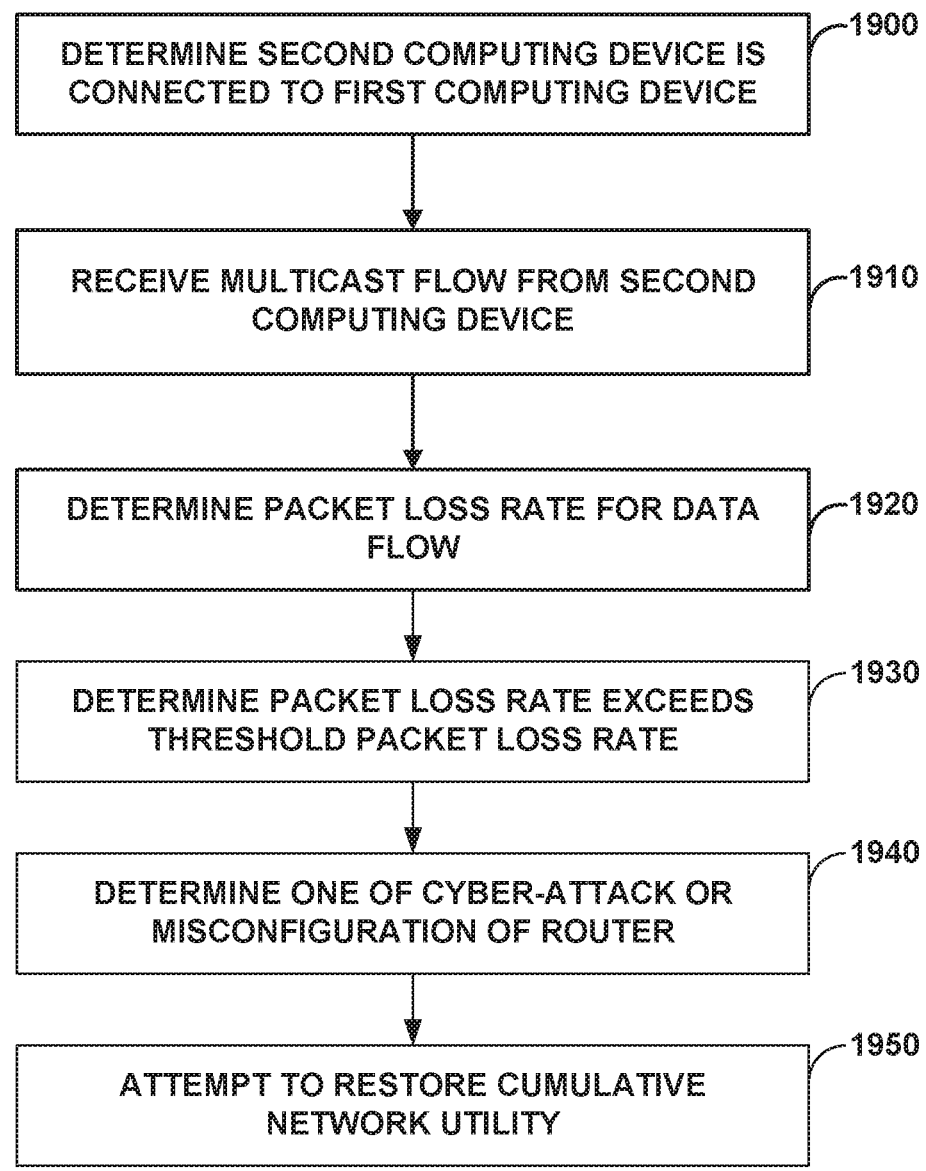
FIG. 20 is a flow diagram illustrating techniques for determining one of a cyber-attack or a misconfiguration of a router within a cipher-text WAN, in accordance with one or more techniques of this disclosure.

FIG. 20 is a flow diagram illustrating techniques for determining one of a cyber-attack or a misconfiguration of a router within a cipher-text WAN, in accordance with one or more techniques of this disclosure. The operations of computing device 10 are described within the context of system 2 of FIG. 1 and computing device 10 of FIG. 2.

In such instances, content module 20 may determine, based at least in part on a connection state in the data packet received from the second computing device, that the second computing device is connected to computing device 10 (1900). Communication module 22 may receive a multicast flow from the second computing device (1910). When receiving the multicast flow, communication module 22 may determine a packet loss rate for the data flow (1920). Communication module 22 may further determine that the packet loss rate exceeds a threshold packet loss rate (1930). Responsive to communication module 22 determining that the packet loss rate exceeds the threshold packet loss rate, status module 24 may determine that the status of cipher-text WAN 4 is one of a cyber-attack or a misconfiguration of a router in cipher-text WAN 4 (1940). To correct this status, communication module 22 may attempt to restore a Cumulative Network Performance for the multicast flow (1950).

Figure 21:
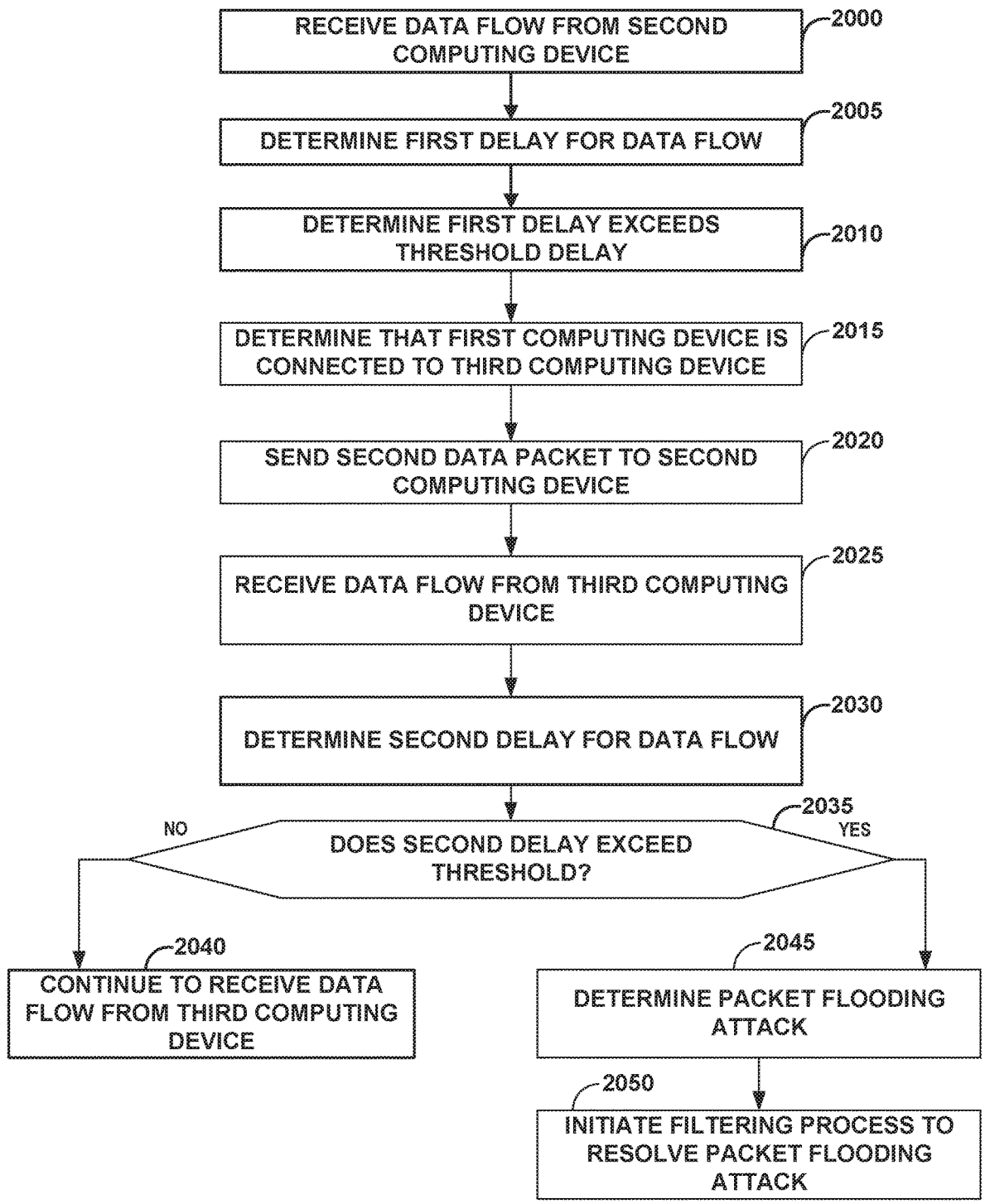
FIG. 21 is a flow diagram illustrating techniques for determining a packet flooding attack within a cipher-text WAN, in accordance with one or more techniques of this disclosure.

FIG. 21 is a flow diagram illustrating techniques for determining a packet flooding attack within a cipher-text WAN, in accordance with one or more techniques of this disclosure. The operations of computing device 10 are described within the context of system 2 of FIG. 1 and computing device 10 of FIG. 2.

In such instances, communication module 22 may receive a data flow from the second computing device (2000). Contents module 20 may determine a first delay for the data flow (2005). Contents module 20 may further determine that the first delay exceeds a threshold delay (2010). Responsive to contents module 20 determining that the first delay exceeds the threshold delay, contents module 20 may determine, based at least in part on the connection state in the data packet received from the second computing device, that the first computing device is connected to a third computing device in a plain-text portion of a third enclave (2015). Communication module 22 may send a second data packet to the second computing device that includes an indication for the second computing device to send the data flow to the first computing device via the third computing device (2020). Communication module 22 may then receive the data flow from the third computing device (2025). Contents module 20 may then determine a second delay for the data flow (2030). Responsive to contents module 20 determining that the second delay does not exceed the threshold delay (NO branch of 2035), communication module 22 may continue to receive the data flow from the third computing device (2040). Conversely, responsive to contents module 20 determining that the second delay also exceeds the threshold delay (YES branch of 2035), status module 24 may determine that the status of cipher-text WAN 4 is a packet flooding attack on first enclave 6A (2045). To correct this status, communication module 22 may initiate a filtering process to resolve the packet flooding attack (2050).

Figure 22:
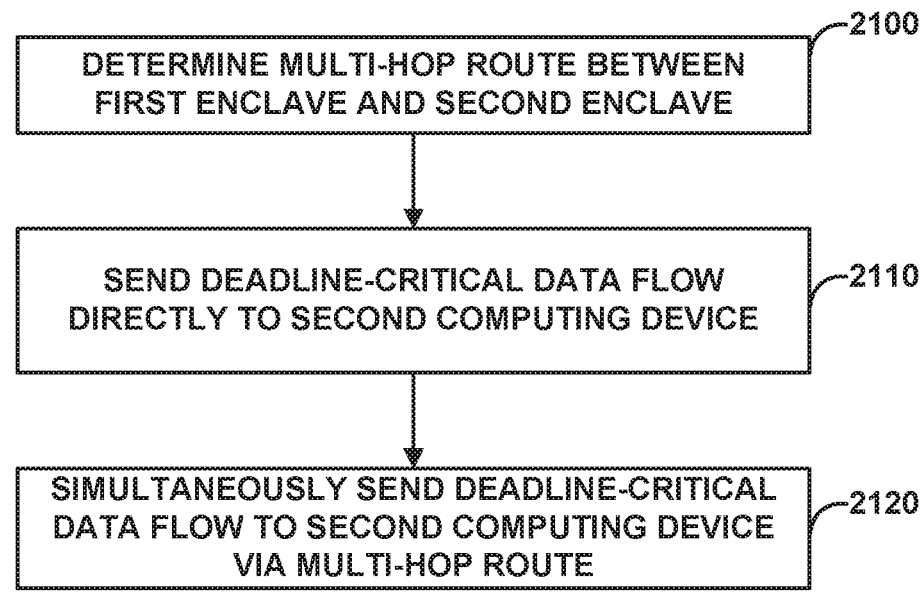
FIG. 22 is a flow diagram illustrating techniques for handling deadline-critical data flows within a cipher-text WAN, in accordance with one or more techniques of this disclosure.

FIG. 22 is a flow diagram illustrating techniques for handling deadline-critical data flows within a cipher-text WAN, in accordance with one or more techniques of this disclosure. The operations of computing device 10 are described within the context of system 2 of FIG. 1 and computing device 10 of FIG. 2.

In such instances, content module 20 may determine, based at least in part on a connection state in the data packet received from the second computing device, a multi-hop route between first enclave 6A and the second enclave (2100). The multi-hop route may include a sequence of one or more connected enclaves that connect first enclave 6A to the second enclave. Communication module 22 may then send a deadline-critical data flow directly to the second computing device (2110). Communication 22 may also simultaneously send the deadline-critical data flow to the second computing device via the multi-hop route (2120).

Figure 23:
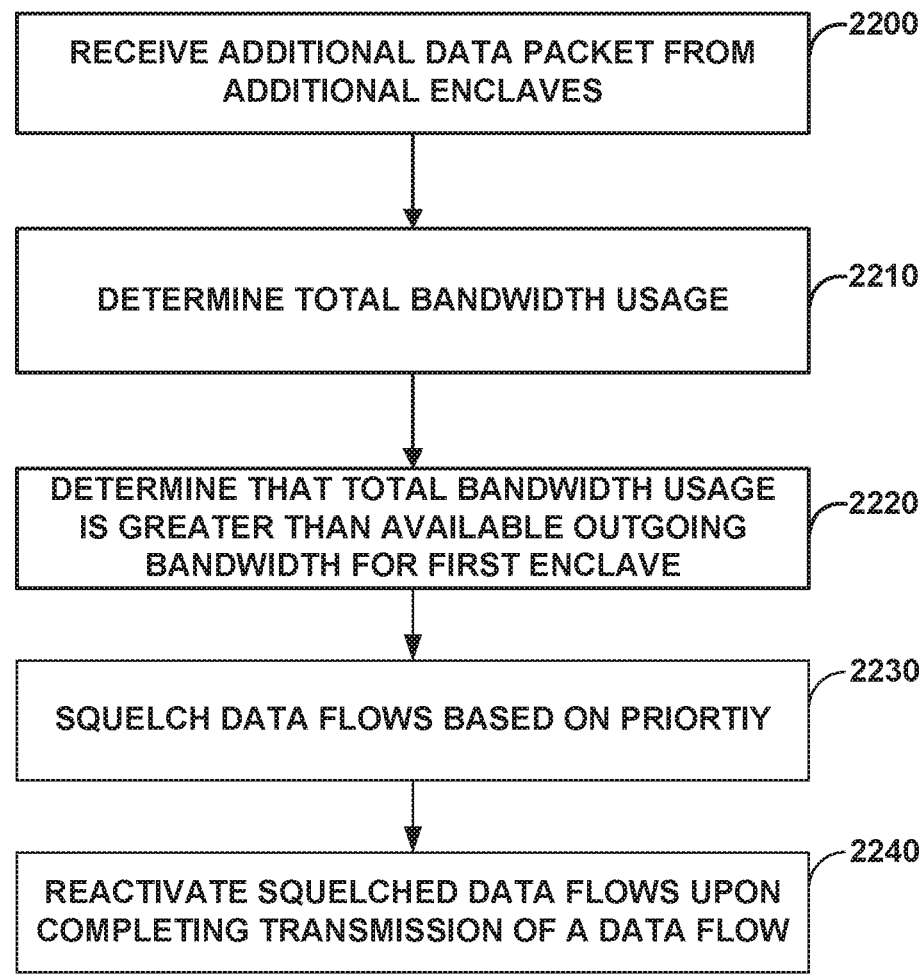
FIG. 23 is a flow diagram illustrating techniques for handling a multicast flow with excessive bandwidth usage within a cipher-text WAN, in accordance with one or more techniques of this disclosure.

FIG. 23 is a flow diagram illustrating techniques for handling a multicast flow with excessive bandwidth usage within a cipher-text WAN, in accordance with one or more techniques of this disclosure. The operations of computing device 10 are described within the context of system 2 of FIG. 1 and computing device 10 of FIG. 2.

In some instances, when the contents of the header include a priority of an associated data flow to the second enclave and the associated data flow is part of a multicast stream originating in first enclave 6A, techniques of this disclosure may handle multicast flows with excessive bandwidth usage. In such instances, communication module 22 may receive an additional data packet from each of one or more additional enclaves (2200). The respective contents of a respective header of the respective additional data packet include a respective priority of a respective associated data flow to the respective enclave of the one or more additional enclaves, and each respective associated data flow is part of the multicast stream originating in the first enclave. Further, each associated data flow may have a same bandwidth usage. Contents module 20 may determine a total bandwidth usage for the multicast stream as a sum of the respective bandwidth usage for each of the respective data flows (2210). Contents module 20 may determine that the total bandwidth usage is greater than an available outgoing bandwidth for first enclave 6A (2220). Responsive to contents module 20 determining that the total bandwidth usage for the multicast stream is greater than the available outgoing bandwidth for first enclave 6A, communication module 22 may squelch, based at least in part on the respective priority of the respective associated data flow to each of the one or more additional enclaves and the second enclave, respective data flows with the lowest respective priorities until the total bandwidth usage for the multicast stream is less than or equal to an available outgoing bandwidth (2230). Upon communication module 22 completing a transmission of a respective data flow, communication module 22 may reactivate the previously squelched data flow with the highest respective priority (2240).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
    receiving, by a first computing device in a plain-text portion of a first enclave behind a first inline network encryptor (INE), a data packet from a second computing device in a plain-text portion of a second enclave behind a second INE via a cipher-text wide-area network (WAN) that carries data traffic between a plurality of enclaves including the first enslave and the second enclave, wherein the first enclave further includes a first group of one or more client devices, wherein the second enclave further includes a second group of one or more client devices, wherein the first group of one or more client devices communicate through the cipher-text WAN via the first computing device, wherein the second group of one or more client devices communicate through the cipher-text WAN via the second computing device, and wherein the first computing device communicates with the second computing device using the cipher-text WAN;
    determining, by the first computing device, contents of a header of the data packet, wherein the contents of the header of the data packet comprise one or more of a timestamp, a connection state, or a priority of an associated data flow to the second enclave;
    detecting, by the first computing device and based at least in part on the one or more of the timestamp, the connection state, or the priority of an associated data flow to the second enclave in the contents of the header of the data packet, a network event affecting a status of the cipher-text WAN, wherein the connection state indicates connection states between the second enclave and each of the other enclaves in the plurality of enclaves;
    performing, by the first computing device and based on the network event affecting the status of the cipher-text WAN, an operation to correct the status of the cipher-text WAN;
    determining, by the first computing device and based at least in part on the connection state in the data packet received from the second computing device, that the second computing device is connected to a third computing device in a plain-text portion of a third enclave in the plurality of enclaves, wherein the third enclave communicates with the first enclave and the second enclave via the cipher-text WAN;
    determining, by the first computing device, that the first computing device is not currently receiving an expected data flow from the third computing device;
    determining, by the first computing device, that the network event affecting the status of the cipher-text WAN is a faulty connection between the first enclave and the third enclave;
    sending, by the first computing device, a second data packet to the second computing device, wherein the second data packet comprises an indication for the second computing device to receive the expected data flow from the third computing device and to send the expected data flow to the first computing device; and
    receiving, by the first computing device and from the second computing device, the expected data flow that was received by the second computing device from the third computing device.

2. The method of claim 1, wherein the contents of the header comprise a first timestamp, wherein the data packet comprises a first data packet, and wherein the method further comprises:
    receiving, by the first computing device, a first data flow from the second computing device via the cipher-text WAN, wherein the first data flow includes the first data packet;
    receiving, by the first computing device, a second data flow from a fourth computing device in a plain-text portion of a fourth enclave via the cipher-text WAN, wherein the second data flow includes a third data packet, wherein contents of a header of the third data packet comprise a second timestamp; and
    responsive to determining that a first bandwidth of the first data flow combined with a second bandwidth of the second data flow exceeds a maximum bandwidth for the first enclave:
        determining, by the first computing device and based at least in part on the first timestamp, that the network event affecting the status of the cipher-text WAN is a bottleneck at the first enclave.

3. The method of claim 2, wherein performing the operation to correct the status of the cipher-text WAN comprises:

responsive to determining that the network event affecting the status of the cipher-text WAN is the bottleneck:
  determining, by the first computing device, a first priority of the first data flow;
  determining, by the first computing device, a second priority of the second data flow;
  comparing, by the first computing device, the first priority and the second priority;
  responsive to determining that the first priority is greater than the second priority, squelching, by the first computing device, the second data flow from the fourth computing device; and
  responsive to determining that the second priority is greater than the first priority, squelching, by the first computing device, the first data flow from the second computing device.

4. The method of claim 3, further comprising:
responsive to determining that the first priority is equal to the second priority:
  determining, by the first computing device, a first time indicated by the first timestamp;
  determining, by the first computing device, a second time indicated by the second timestamp located in the contents of the header of the third data packet;
  comparing, by the first computing device, the first time and the second time;
  responsive to determining that the first time is earlier than the second time, squelching, by the first computing device, the second data flow from the fourth computing device; and
  responsive to determining that the second time is earlier than the first time, squelching, by the first computing device, the first data flow from the second computing device.

5. The method of claim 3, wherein squelching the first data flow comprises:
  sending, by the first computing device, a fourth data packet to the second computing device, wherein the fourth data packet includes an indication for the second computing device to cease sending the first data flow to the first computing device; and
  responsive to determining that the fourth computing device has completed sending the second data flow to the first computing device, sending, by the first computing device, a fifth data packet to the second computing device, wherein the fifth data packet includes an indication for the second computing device to resume sending the first data flow to the first computing device.

6. The method of claim 1, wherein the contents of the header comprise the timestamp, wherein the method further comprises:
  receiving, by the first computing device, a bulk data transfer from the second computing device;
  receiving, by the first computing device, a data flow from the second computing device, wherein the data packet is associated with the data flow, and wherein the timestamp indicates a time at which the data packet was sent by the second computing device;
  determining, by the first computing device and based at least in part on the timestamp of the data packet, a delay for the data flow;
  responsive to determining that the delay for the data flow is above a threshold delay:
    determining, by the first computing device, that the network event affecting the status of the cipher-text WAN is a performance latency;
    sending, by the first computing device, a third data packet to the second computing device, wherein the third data packet comprises an indication for the second computing device to re-route the data flow through a fourth computing device in a plain-text portion of a fourth enclave; and
    receiving, by the first computing device, the data flow from the fourth computing device.

7. The method of claim 1, wherein the contents of the header comprise the connection state, wherein the method further comprises:
  determining, by the first computing device, based at least in part on the connection state in the data packet received from the second computing device that the second computing device is unidirectionally connected to the first computing device and that the second computing device is bidirectionally connected to a fourth computing device in a plain-text portion of a fourth enclave;
  determining, by the first computing device, that the network event affecting the status of the cipher-text WAN is a malicious configuration of one or more routers in the cipher-text WAN;
  sending, by the first computing device, a third data packet to the fourth computing device, wherein the third data packet comprises an indication for the second computing device to send a data flow to the first computing device; and
  receiving, by the first computing device, the data flow from the second computing device.

8. The method of claim 1, wherein the contents of the header comprise the connection state, wherein the method further comprises:
  determining, by the first computing device, based at least in part on the connection state in the data packet received from the second computing device that a fourth computing device in a plain-text portion of a fourth enclave has lost connection with the first computing device;
  determining, by the first computing device, that the network event affecting the status of the cipher-text WAN is a dropped direct connection between the first enclave and the fourth enclave; determining, by the first computing device and based at least in part on the connection state in the data packet received from the second computing device, a multi-hop route between the first enclave and the fourth enclave, wherein the multi-hop route comprises a sequence of one or more connected enclaves that connect the first enclave to the fourth enclave; and
  sending, by the first computing device, a data flow intended for the fourth computing device to a first connected enclave of the sequence of one or more connected enclaves.

9. The method of claim 1, wherein the contents of the header comprise the connection state, wherein the method further comprises:
  determining, by the first computing device, based at least in part on the connection state in the data packet received from the second computing device that the second computing device is connected to the first computing device;
  determining, by the first computing device, that the first computing device is not currently receiving an expected multicast flow from the second computing device;

determining, by the first computing device, that the network event affecting the status of the cipher-text WAN is a misconfiguration of a rendezvous point within the cipher-text WAN;
  attempting, by the first computing device, to recover a connection to a multicast tree for the second computing device.

10. The method of claim 1, wherein the contents of the header comprise the connection state, wherein the method further comprises:
  determining, by the first computing device and based at least in part on the connection state in the data packet received from the second computing device, that the second computing device is connected to the first computing device;
  receiving, by the first computing device, a multicast flow from the second computing device;
  determining, by the first computing device, a packet loss rate for the data flow; and
  responsive to determining that the packet loss rate exceeds a threshold packet loss rate;
  determining, by the first computing device, that the network event affecting the status of the cipher-text WAN is one of a cyber-attack or a misconfiguration of a router in the cipher-text WAN; and
  attempting, by the first computing device, to restore a Cumulative Network Performance for the multicast flow.

11. The method of claim 1, wherein the contents of the header comprise the connection state, wherein the data packet comprises a first data packet, and wherein the method further comprises:
  receiving, by the first computing device, a data flow from the second computing device, wherein the data flow includes the first data packet;
  determining, by the first computing device, a first delay for the data flow;
  responsive to determining that the first delay exceeds a threshold delay, determining, by the first computing device and based at least in part on the connection state in the data packet received from the second computing device, that the first computing device is connected to a fourth computing device in a plain-text portion of a fourth enclave;
  sending, by the first computing device, a third data packet to the second computing device, wherein the third data packet comprises an indication for the second computing device to send the data flow to the first computing device via the fourth computing device;
  receiving, by the first computing device, the data flow from the fourth computing device;
  determining, by the first computing device, a second delay for the data flow;
  responsive to determining that the second delay does not exceed the threshold delay, continuing, by the first computing device, to receive the data flow from the fourth computing device; and
  responsive to determining that the second delay exceeds the threshold delay:
    determining, by the first computing device, that the network event affecting the status of the cipher-text WAN is a packet flooding attack on the first enclave; and
    initiating, by the first computing device, a filtering process to resolve the packet flooding attack.

12. The method of claim 1, wherein the contents of the header comprise the connection state, wherein the method further comprises:
  determining, by the first computing device and based at least in part on the connection state in the data packet received from the second computing device, a multi-hop route between the first enclave and the second enclave, wherein the multi-hop route comprises a sequence of one or more connected enclaves that connect the first enclave to the second enclave;
  sending, by the first computing device, a deadline-critical data flow directly to the second computing device; and
  simultaneously sending, by the first computing device, the deadline-critical data flow to the second computing device via the multi-hop route.

13. The method of claim 1, wherein the contents of the header comprise the priority of the associated data flow to the second enclave, wherein the associated data flow is part of a multicast stream originating in the first enclave, wherein the method further comprises:
  receiving, by the first computing device, an additional data packet from each of one or more additional enclaves, wherein respective contents of a respective header of the respective additional data packet comprise a respective priority of a respective associated data flow to the respective enclave of the one or more additional enclaves, wherein each respective associated data flow is part of the multicast stream originating in the first enclave, and wherein each associated data flow has a same bandwidth usage;
  determining, by the first computing device, a total bandwidth usage for the multicast stream, wherein the total bandwidth usage comprises a sum of the respective bandwidth usage for each of the respective data flows;
  responsive to determining that the total bandwidth usage for the multicast stream is greater than an available outgoing bandwidth for the first enclave:
    squelching, by the first computing device and based at least in part on the respective priority of the respective associated data flow to each of the one or more additional enclaves and the second enclave, respective data flows with the lowest respective priorities until the total bandwidth usage for the multicast stream is less than or equal to an available outgoing bandwidth; and
    upon the first computing device completing a transmission of a respective data flow, reactivating, by the first computing device, the previously squelched data flow with the highest respective priority.

14. The method of claim 1, wherein the first computing device comprises a portion of an inline network encryption device.

15. A first computing device positioned in a plain-text portion of a first enclave behind a first inline network encryptor (INE), the first computing device comprising:
  two or more interfaces, wherein at least a first interface is configured to communicate with a first group of one or more client devices in the first enclave and at least a second interface is configured to communicate with a cipher-text wide-area network (WAN); and
  one or more hardware processors configured to:
    receive a data packet from a second computing device in a plain-text portion of a second enclave behind a second INE via the cipher-text WAN, wherein the second enclave further includes a second group of one or more client devices, wherein the first group of one or more client devices communicate through the cipher-text WAN via the first computing device, wherein the second group of one or more client devices communicate through the cipher-text WAN via the second computing device, and wherein the first computing device communicates with the second computing device using the cipher-text WAN that carries data traffic between a plurality of enclaves including the first enslave and the second enclave;

determine contents of a header of the data packet, wherein the contents of the header of the data packet comprise one or more of a timestamp, a connection state, or a priority of an associated data flow to the second enclave;

detecting, based at least in part on the one or more of the timestamp, the connection state, or the priority of an associated data flow to the second enclave in the contents of the header of the data packet, a network event affecting a status of the cipher-text WAN, wherein the connection state indicates connection states between the second enclave and each of the other enclaves in the plurality of enclaves that communicate with each other via the cipher-text WAN; and perform, based on the network event affecting the status of the cipher-text WAN, an operation to correct the status of the cipher-text WAN;

determine, based at least in part on the connection state in the data packet received from the second computing device, that the second computing device is connected to a third computing device in a plain-text portion of a third enclave in the plurality of enclaves, wherein the third enclave communicates with the first enclave and the second enclave via the cipher-text WAN;

determine that the first computing device is not currently receiving an expected data flow from the third computing device;

determine that the network event affecting the status of the cipher-text WAN is a faulty connection between the first enclave and the third enclave;

send a second data packet to the second computing device, wherein the second data packet comprises an indication for the second computing device to receive the expected data flow from the third computing device and to send the expected data flow to the first computing device; and receive, from the second computing device, the expected data flow that was received by the second computing device from the third computing device.

16. The first computing device of claim 15, wherein the contents of the header comprise a first timestamp, wherein the data packet comprises a first data packet, and wherein the one or more processors are further configured to:

receive a first data flow from the second computing device via the cipher-text WAN, wherein the first data flow includes the first data packet;

receive a second data flow from a fourth computing device in a plain-text portion of a fourth enclave via the cipher-text WAN, wherein the second data flow includes a third data packet, wherein contents of a header of the third data packet comprise a second timestamp; and responsive to determining that a first bandwidth of the first data flow combined with a second bandwidth of the second data flow exceeds a maximum bandwidth for the first enclave:

determine, based at least in part on the first timestamp, that the network event affecting the status of the cipher-text WAN is a bottleneck at the first enclave.

17. The first computing device of claim 16, the one or more processors are further configured to:

responsive to determining that the network event affecting the status of the cipher-text WAN is the bottleneck:

determine a first priority of the first data flow;

determine a second priority of the second data flow;

compare the first priority and the second priority;

responsive to determining that the first priority is greater than the second priority, squelch the second data flow from the fourth computing device; and responsive to determining that the second priority is greater than the first priority, squelch the first data flow from the second computing device.

18. The first computing device of claim 17, the one or more processors are further configured to:

responsive to determining that the first priority is equal to the second priority:

determine a first time indicated by the first timestamp;

determine a second time indicated by the second timestamp located in the contents of the header of the third data packet;

compare the first time and the second time;

responsive to determining that the first time is earlier than the second time, squelch the second data flow from the fourth computing device; and responsive to determining that the second time is earlier than the first time, squelch the first data flow from the second computing device.

19. The first computing device of claim 17, wherein the one or more processors being configured to squelch the first data flow comprises the one or more processors being configured to:

send a fourth data packet to the second computing device, wherein the fourth data packet includes an indication for the second computing device to cease sending the first data flow to the first computing device; and responsive to determining that the fourth computing device has completed sending the second data flow to the first computing device, send a fifth data packet to the second computing device, wherein the fifth data packet includes an indication for the second computing device to resume sending the first data flow to the first computing device.

20. The first computing device of claim 15, wherein the contents of the header comprise the timestamp, wherein the one or more processors are further configured to:

receive a bulk data transfer from the second computing device;

receive a data flow from the second computing device, wherein the data packet is associated with the data flow, and wherein the timestamp indicates a time at which the data packet was sent by the second computing device;

determine, based at least in part on the timestamp of the data packet, a delay for the data flow;

responsive to determining that the delay for the data flow is above a threshold delay:

determine that the network event affecting the status of the cipher-text WAN is a performance latency;

send a third data packet to the second computing device, wherein the third data packet comprises an indication for the second computing device to re-route the data flow through a fourth computing device in a plain-text portion of a fourth enclave; and receive the data flow from the third computing device.

21. The first computing device of claim 15, wherein the contents of the header comprise the connection state, wherein the one or more processors are further configured to:
   determine based at least in part on the connection state in the data packet received from the second computing device that the second computing device is unidirectionally connected to the first computing device and that the second computing device is bidirectionally connected to a fourth computing device in a plain-text portion of a fourth enclave;
   determine that the network event affecting the status of the cipher-text WAN is a malicious configuration of one or more routers in the cipher-text WAN;
   send a third data packet to the fourth computing device, wherein the third data packet comprises an indication for the second computing device to send a data flow to the first computing device; and
   receive the data flow from the second computing device.

22. The first computing device of claim 15, wherein the contents of the header comprise the connection state, wherein the one or more processors are further configured to:
   determine based at least in part on the connection state in the data packet received from the second computing device that a fourth computing device in a plain-text portion of a fourth enclave has lost connection with the first computing device;
   determine that the network event affecting the status of the cipher-text WAN is a dropped direct connection between the first enclave and the fourth enclave;
   determine, based at least in part on the connection state in the data packet received from the second computing device, a multi-hop route between the first enclave and the fourth enclave, wherein the multi-hop route comprises a sequence of one or more connected enclaves that connect the first enclave to the fourth enclave; and
   send a data flow intended for the fourth computing device to a first connected enclave of the sequence of one or more connected enclaves.

23. The first computing device of claim 1, wherein the contents of the header comprise the connection state, wherein the one or more processors are further configured to:
   determine based at least in part on the connection state in the data packet received from the second computing device that the second computing device is connected to the first computing device;
   determine that the first computing device is not currently receiving an expected multicast flow from the second computing device;
   determine that the network event affecting the status of the cipher-text WAN is a misconfiguration of a rendezvous point within the cipher-text WAN;
   attempt to recover a connection to a multicast tree for the second computing device.

24. The first computing device of claim 15, wherein the contents of the header comprise the connection state, wherein the one or more processors are further configured to:
   determine, based at least in part on the connection state in the data packet received from the second computing device, that the second computing device is connected to the first computing device;
   receive a multicast flow from the second computing device;
   determine a packet loss rate for the data flow; and
   responsive to determining that the packet loss rate exceeds a threshold packet loss rate:
      determine that the network event affecting the status of the cipher-text WAN is one of a cyber-attack or a misconfiguration of a router in the cipher-text WAN; and
      attempt to restore a Cumulative Network Performance for the multicast flow.

25. The first computing device of claim 15, wherein the contents of the header comprise the connection state, wherein the data packet comprises a first data packet, and wherein the one or more processors are further configured to:
   receive a data flow from the second computing device, wherein the data flow includes the first data packet;
   determine a first delay for the data flow;
   responsive to determining that the first delay exceeds a threshold delay, determine, based at least in part on the connection state in the data packet received from the second computing device, that the first computing device is connected to a fourth computing device in a plain-text portion of a fourth enclave;
   send a third data packet to the second computing device, wherein the third data packet comprises an indication for the second computing device to send the data flow to the first computing device via the fourth computing device;
   receive the data flow from the fourth computing device;
   determine a second delay for the data flow;
   responsive to determining that the second delay does not exceed the threshold delay, continue to receive the data flow from the fourth computing device; and
   responsive to determining that the second delay exceeds the threshold delay:
      determine that the network event affecting the status of the cipher-text WAN is a packet flooding attack on the first enclave; and
      initiate a filtering process to resolve the packet flooding attack.

26. The first computing device of claim 15, wherein the contents of the header comprise the connection state, and wherein the one or more processors are further configured to:
   determine, based at least in part on the connection state in the data packet received from the second computing device, a multi-hop route between the first enclave and the second enclave, wherein the multi-hop route comprises a sequence of one or more connected enclaves that connect the first enclave to the second enclave;
   send a deadline-critical data flow directly to the second computing device; and
   simultaneously send the deadline-critical data flow to the second computing device via the multi-hop route.

27. The first computing device of claim 15, wherein the contents of the header comprise the priority of the associated data flow to the second enclave, wherein the associated data flow is part of a multicast stream originating in the first enclave, wherein the one or more processors are further configured to:
   receive an additional data packet from each of one or more additional enclaves, wherein respective contents of a respective header of the respective additional data packet comprise a respective priority of a respective associated data flow to the respective enclave of the one or more additional enclaves, wherein each respective associated data flow is part of the multicast stream originating in the first enclave, and wherein each associated data flow has a same bandwidth usage;

determine a total bandwidth usage for the multicast stream, wherein the total bandwidth usage comprises a sum of the respective bandwidth usage for each of the respective data flows;

responsive to determining that the total bandwidth usage for the multicast stream is greater than an available outgoing bandwidth for the first enclave:

squelch, based at least in part on the respective priority of the respective associated data flow to each of the one or more additional enclaves and the second enclave, respective data flows with the lowest respective priorities until the total bandwidth usage for the multicast stream is less than or equal to an available outgoing bandwidth; and upon the first computing device completing a transmission of a respective data flow, reactivate the previously squelched data flow with the highest respective priority.

28. A non-transitory computer-readable storage medium storing instructions that, when executed, cause one or more processors of a first computing device positioned in a plain-text portion of a first enclave behind a first inline network encryptor (INE) to:

receive a data packet from a second computing device in a plain-text portion of a second enclave behind a second INE via a cipher-text wide-area network (WAN) that carries data traffic between a plurality of enclaves including the first enslave and a second enclave, wherein the first enclave further includes a first group of one or more client devices, wherein the second enclave further includes a second group of one or more client devices, wherein the first group of one or more client devices communicate through the cipher-text WAN via the first computing device, wherein the second group of one or more client devices communicate through the cipher-text WAN via the second computing device, and wherein the first computing device communicates with the second computing device using the cipher-text WAN;

determine contents of a header of the data packet, wherein the contents of the header of the data packet comprise one or more of a timestamp, a connection state, or a priority of an associated data flow to the second enclave;

detecting, based at least in part on the one or more of the timestamp, the connection state, or the priority of an associated data flow to the second enclave in the contents of the header of the data packet, a network event affecting a status of the cipher-text WAN, wherein the connection state indicates connection states between the second enclave and each of the other enclaves in the plurality of enclaves;

perform, based on the network event affecting the status of the cipher-text WAN, an operation to correct the status of the cipher-text WAN; and determine, based at least in part on the connection state in the data packet received from the second computing device, that the second computing device is connected to a third computing device in a plain-text portion of a third enclave in the plurality of enclaves, wherein the third enclave communicates with the first enclave and the second enclave via the cipher-text WAN;

determine that the first computing device is not currently receiving an expected data flow from the third computing device;

determine that the network event affecting the status of the cipher-text WAN is a faulty connection between the first enclave and the third enclave;

send a second data packet to the second computing device, wherein the second data packet comprises an indication for the second computing device to receive the expected data flow from the third computing device and to send the expected data flow to the first computing device, and receive, from the second computing device, the expected data flow that was received by the second computing device from the third computing device.

\* \* \* \* \*